United States Patent
Kurita et al.

(10) Patent No.: US 11,118,542 B2
(45) Date of Patent: Sep. 14, 2021

(54) ENGINE SYSTEM

(71) Applicant: AISAN KOGYO KABUSHIKI KAISHA, Obu (JP)

(72) Inventors: Masanao Kurita, Toyoake (JP); Masateru Nagao, Ichinomiya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/966,512

(22) PCT Filed: Apr. 4, 2019

(86) PCT No.: PCT/IB2019/052742
§ 371 (c)(1),
(2) Date: Jul. 31, 2020

(87) PCT Pub. No.: WO2019/175855
PCT Pub. Date: Sep. 19, 2019

(65) Prior Publication Data
US 2021/0047990 A1 Feb. 18, 2021

(30) Foreign Application Priority Data

Mar. 13, 2018 (JP) .............................. JP2018-046009

(51) Int. Cl.
*F02M 26/49* (2016.01)
*F02M 26/66* (2016.01)
(Continued)

(52) U.S. Cl.
CPC ............ *F02M 26/49* (2016.02); *F02M 26/66* (2016.02); *F02D 2041/0017* (2013.01); *F02D 2200/0406* (2013.01); *F02M 26/53* (2016.02)

(58) Field of Classification Search
CPC ........ F02M 26/49; F02M 26/53; F02M 26/64; F02D 2041/0017
See application file for complete search history.

(56) References Cited

U.S. PATENT DOCUMENTS 9,222,441 B2 12/2015 Yoshioka
10,436,132 B2 * 10/2019 Yamada ................ F02D 41/009
(Continued)

FOREIGN PATENT DOCUMENTS

JP 2008-088918 A 4/2008
JP 2011-085050 A 4/2011
(Continued)

OTHER PUBLICATIONS

Mar. 10, 2021 Office Action issued in Indian Patent Application No. 202047043436.

(Continued)

*Primary Examiner* — Thomas N Moulis
(74) *Attorney, Agent, or Firm* — Oliff PLC

(57) ABSTRACT

This engine system is provided with a throttle device, an EGR valve, and an ECU. The ECU diagnoses an abnormality of the EGR valve on the basis of an operating state during an engine deceleration, and diagnoses combustion deterioration of an engine on the basis of a crank angle speed change during the engine deceleration (not during a fuel cut-off). The ECU executes an engine stall avoidance control with the throttle device when it is determined there is an abnormality in the EGR valve, makes a final determination that the EGR valve has an abnormality and continues the engine stall avoidance control when it is determined thereafter that there is combustion deterioration, and makes a final determination that the EGR valve is normal and cancels the engine stall avoidance control when it is determined that there is no combustion deterioration.

4 Claims, 19 Drawing Sheets

(51) Int. Cl.
*F02M 26/53* (2016.01)
*F02D 41/00* (2006.01)

(56) References Cited

U.S. PATENT DOCUMENTS

| | | | |
|---|---|---|---|
| 11,035,324 B2* | 6/2021 | Itoh | F02D 41/042 |
| 2010/0186726 A1* | 7/2010 | Takagi | F02M 26/49 |
| | | | 123/568.16 |
| 2013/0319383 A1* | 12/2013 | Yoshioka | F02D 41/123 |
| | | | 123/568.21 |
| 2014/0096744 A1* | 4/2014 | Momino | F02D 41/30 |
| | | | 123/357 |
| 2014/0137844 A1* | 5/2014 | Yoshioka | F02D 41/107 |
| | | | 123/568.19 |
| 2014/0298801 A1* | 10/2014 | Akita | F02D 41/005 |
| | | | 60/602 |
| 2015/0198102 A1* | 7/2015 | Nakamura | F02D 41/12 |
| | | | 60/605.2 |
| 2017/0276083 A1 | 9/2017 | Saiki et al. | |
| 2018/0171944 A1* | 6/2018 | Nakamura | F02M 35/104 |
| 2019/0107064 A1* | 4/2019 | Yoshioka | F02D 41/221 |
| 2019/0293007 A1* | 9/2019 | Yoshioka | F02D 41/0097 |
| 2019/0338717 A1* | 11/2019 | Nagao | F02M 26/50 |
| 2019/0345882 A1* | 11/2019 | Yoshioka | F02D 41/005 |
| 2021/0123397 A1* | 4/2021 | Itoh | F02M 26/49 |

FOREIGN PATENT DOCUMENTS

| | | |
|---|---|---|
| JP | 2011-252399 A | 12/2011 |
| JP | 2013-083249 A | 5/2013 |
| JP | 2013-249774 A | 12/2013 |
| JP | 5843543 B2 | 1/2016 |
| JP | 2017-133372 A | 8/2017 |
| JP | 2017-172434 A | 9/2017 |
| JP | 2017-172573 A | 9/2017 |
| JP | 6486536 B1 | 3/2019 |

OTHER PUBLICATIONS

Sep. 15, 2020 International Preliminary Report on Patentability issued in International Patent Application No. PCT/IB2019/052742.
Nov. 20, 2018 Office Action issued in Japanese Patent Application No. 2018-046009.
Jun. 18, 2019 International Search Report issued in International Patent Application No. PCT/IB32019/052742.

* cited by examiner

ELAPSED TIME AFTER DECELERATION (s)

ENGINE SYSTEM

CROSS-REFERENCE TO RELATED APPLICATIONS

This is a US national phase application based on the PCT International Patent Application No. PCT/IB2019/052742 filed on Apr. 4, 2019, and claiming the priority of Japanese Patent Application No. 2018-046009 filed on Mar. 13, 2018, the entire contents of which are herewith incorporated by reference.

TECHNICAL FIELD

The present disclosure relates to an engine system provided with an exhaust gas recirculation device (including an exhaust gas recirculation valve) to allow part of exhaust gas of an engine to recirculate as an exhaust recirculation gas into the engine, and configured to control the exhaust gas recirculation valve when the exhaust gas recirculation valve is determined to be abnormal in a full-closing operation during deceleration of the engine.

BACKGROUND ART

As the above type of technology, for example, a technique referred to as a "Control device of internal combustion engine" described in Patent Document 1 listed below has conventionally been known. This technique includes an EGR device for recirculating part of exhaust gas of an engine into the engine as EGR gas, a throttle valve for regulating the amount of intake air to be sucked into the engine through an intake passage, and a control device for controlling the EGR device and the throttle valve according to the operating conditions of the engine. The EGR device includes an EGR passage connecting the exhaust passage and the intake passage of the engine, and an EGR valve provided in the EGR passage. The EGR valve has a valve element and a valve seat. An outlet of the EGR passage is connected to the intake passage downstream of the throttle valve. Further, an intake pressure sensor is provided in the intake passage downstream of the throttle valve to detect the intake pressure at that part. Herein, the control device determines, based on a detection value of the intake pressure sensor, whether or not a foreign matter is caught or lodged between the valve element and the valve seat of the EGR valve when the EGR valve is fully closed during deceleration or the like of the engine.

When it is determined that a foreign matter is lodged while the engine is in a low load operating state, the control device performs the engine stall avoidance control to control the throttle valve to open in order to increase the amount of intake air is supplied to the engine and also execute the foreign-matter removal control to repeat opening and closing operations of the EGR valve several times. This improves idle-up of the engine to avoid engine stall, and remove foreign matter lodged in the EGR valve.

RELATED ART DOCUMENTS

Patent Documents

Patent Document 1: JP-A-2017-133372

SUMMARY OF INVENTION

Problems to be Solved by the Invention

Meanwhile, in the technique described in Patent Document 1, in order to avoid the engine stall at the early stages of engine deceleration, it is necessary to early detect lodgment of a foreign matter ("foreign-matter lodging"). However, as the timing of detecting the foreign-matter lodging is made earlier, the false detection may be caused with higher frequency. As a result, if the foreign-matter lodging is erroneously detected, the engine stall avoidance control which should be unnecessary is disadvantageously executed.

This disclosure has been made to address the above problems and has a purpose to provide an engine system capable of early detecting abnormality that an exhaust gas recirculation valve could not be placed in a completely fully-closed state due to lodgment of a foreign matter during deceleration of an engine to perform the engine stall avoidance control at an early stage and prevent erroneous detection of the abnormality and avoid unnecessary execution of engine stall avoidance control.

Means of Solving the Problems

To achieve the foregoing purpose, one aspect of the present disclosure provides an engine system comprising: an engine; an intake passage configured to introduce intake air into the engine; an exhaust passage configured to discharge exhaust gas from the engine; a fuel supply unit configured to supply fuel to the engine; an exhaust gas recirculation device including: an exhaust gas recirculation passage configured to allow part of the exhaust gas discharged from the engine to the exhaust passage to flow as an exhaust recirculation gas into the intake passage to recirculate into the engine; and an exhaust gas recirculation valve configured to regulate a flow rate of the exhaust recirculation gas in the exhaust gas recirculation passage, the exhaust gas recirculation valve including a valve seat and a valve element provided to be capable of seating on the valve seat; an output adjusting unit configured to adjust output of the engine; an operating-state detecting unit configured to detect an operating state of the engine; and a controller configured to control at least the fuel supply unit, the exhaust gas recirculation valve, and the output adjusting unit based on the detected operating state of the engine, wherein, during deceleration of the engine, the controller is configured to diagnose whether or not abnormality exists in the exhaust gas recirculation valve in opening/closing between the valve seat and the valve element based on the detected operating state of the engine, and when fuel is supplied to the engine by the fuel supply unit during deceleration of the engine, the controller is also configured to diagnose whether or not combustion deterioration exists in the engine based on the detected operating state, when it is provisionally determined that the abnormality exists, the controller is configured to control the output adjusting unit to perform a predetermined engine stall avoidance control, and when it is subsequently determined that the combustion deterioration exists, the controller is configured to finally determine that the abnormality exists and continue the engine stall avoidance control, or when it is subsequently determined that the combustion deterioration does not exist, the controller is configured to finally determine that the abnormality does not exist and cancel the engine stall avoidance control.

According to the foregoing configuration (1), whether or not the exhaust gas recirculation valve is abnormal in opening and closing a gap between the valve seat and the valve element is diagnosed based on the detected operating state during deceleration of the engine and further when fuel is supplied to the engine by the fuel supply unit during engine deceleration, whether or not the combustion of the engine is deteriorated is determined based on the detected operating state. Furthermore, when the exhaust gas recirculation valve is provisionally determined to be abnormal, the output adjusting unit is controlled to perform the predetermined engine stall avoidance control. Therefore, if the exhaust gas recirculation valve does not completely come to a fully-closed state due to lodgment of foreign matter(s) or other causes and the exhaust gas recirculation gas may leak into intake air, the system can take early measures to avoid engine stall. Further, when it is subsequently determined that the deterioration in combustion exists, it is finally determined that the abnormality exists and also the engine stall avoidance control is continued. This achieves an accurate diagnostic result that the abnormality exists in the exhaust gas recirculation valve, so that engine stall is effectively avoided. Alternatively, when it is subsequently determined that no combustion deterioration exists, it is finally determined that no abnormality exists and also the engine stall avoidance control is canceled. This achieves an accurate diagnostic result that the abnormality does not exists in the exhaust gas recirculation valve, i.e., that the exhaust gas recirculation valve is normal, so that unnecessary engine stall avoidance control is not performed.

(2) To achieve the foregoing purpose, in the aforesaid configuration (1), the operating-state detecting unit includes a crank angular velocity detecting unit configured to detect a crank angular velocity of the engine, and the controller is configured to diagnose whether or not the combustion deterioration exists in the engine based on a change in the detected crank angular velocity.

According to the forgoing configuration (2), in addition to the operations of the aforementioned configuration (1), if the combustion deterioration leading to engine stall of the engine exists in the engine, this condition is reflected in a change in the crank angular velocity of the engine. Thus, whether or not the combustion deterioration exists in the engine is diagnosed based on a change in the detected crank angular velocity. This can appropriately determine whether or not the combustion deterioration leading to engine stall exists.

(3) To achieve the foregoing purpose, in the aforesaid configuration (1) or (2), the output adjusting unit includes an intake amount adjusting valve configured to adjust an amount of intake air allowed to flow through the intake passage, the operating-state detecting unit includes a rotation number detecting unit configured to detect the number of rotations of the engine, and the controller is configured to perform feedback control of the intake amount adjusting valve such that the detected number of rotations becomes a predetermined target idle rotation number, and configured to execute idle-up control, as the engine stall avoidance control, in which the target idle rotation number is set to a predetermined set value to avoid engine stall until a predetermined time elapses from start of the deceleration.

According to the forgoing configuration (3), in addition to the operations of the aforementioned configuration (1) or (2), the intake amount adjusting valve is feedback-controlled such that the detected rotation number becomes the predetermined target idle rotation number. Herein, as the engine stall avoidance control, the target idle rotation number is set to a predetermined set value to avoid engine stall until a predetermined time elapses from the start of deceleration. Accordingly, for instance, even if the exhaust gas recirculation valve does not completely come to a fully-closed state due to foreign-matter lodging or other causes and hence the exhaust gas recirculation gas leaks into the intake air, the engine is idled up until the set value for avoiding engine stall. Thus, the engine stall is avoided.

Effects of the Invention

According to the forgoing configuration (1), during deceleration of the engine, the system can early detect abnormality that the exhaust gas recirculation valve does not completely come to a fully-closed state due to foreign-matter lodging or other causes and thus execute the engine stall avoidance control at an early stage and further can avoid erroneous detection of the abnormality in the exhaust gas recirculation valve and prevent unnecessary execution of the engine stall avoidance control.

According to the forgoing configuration (2), in addition to the effects of the aforementioned configuration (1), the system can ascertain special behaviors of the crank angular velocity, which appear in the state where the exhaust gas recirculation valve is abnormal, and hence can reliably perform abnormality diagnosis of the exhaust gas recirculation valve.

According to the forgoing configuration (3), in addition to the effects of the aforementioned configuration (1) or (2), the system can avoid a delay in increasing an intake amount caused by idle-up at the early stage of deceleration of the engine, thereby reliably avoiding the engine stall.

MODE FOR CARRYING OUT THE INVENTION

First Embodiment

A detailed description of a first embodiment of an engine system embodied into a gasoline engine system will now be given referring to the accompanying drawings.

Outline of Engine System

Figure 1:
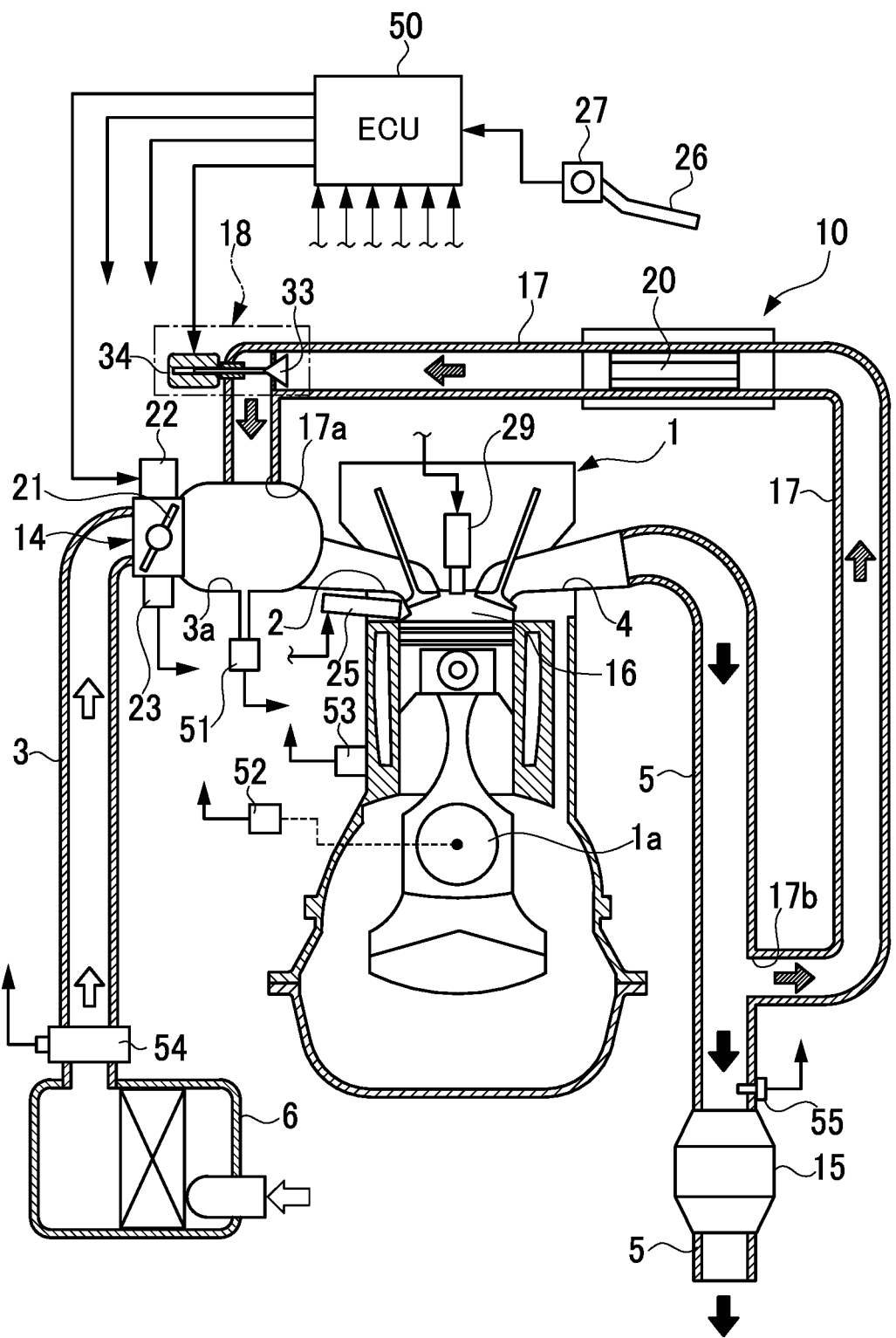
FIG. 1 is a schematic configuration diagram of a gasoline engine system in a first embodiment.

FIG. 1 is a schematic configuration diagram showing a gasoline engine system (hereinafter, simply referred to as an "engine system") in the present embodiment. This engine system is provided with a reciprocating 4-cylinder engine 1. This engine 1 includes an intake port 2 connected to an intake passage 3 and an exhaust port 4 connected to an exhaust passage 5. At an inlet of the intake passage 3, an air cleaner 6 is provided.

In the intake passage 3, a surge tank 3a is provided and an electronic throttle device 14 is placed upstream of the surge tank 3. The electronic throttle device 14 includes a throttle valve 21, a DC motor 22 to drive the throttle valve 21 to open and close, and a throttle sensor 23 to detect an opening degree TA of the throttle valve 21 (i.e., a throttle opening degree). The electronic throttle device 14 is configured such that the opening degree of the throttle valve 21 is adjusted by driving of the DC motor 22 according to an accelerator pedal 26 operated by a driver. In the exhaust passage 5, a catalytic converter 15 is provided to clean exhaust gas.

In the engine 1, an injector 25 is provided to inject and supply fuel into a combustion chamber 16. The fuel is supplied to the injector 25 from a fuel tank (not shown). The injector 25 corresponds to one example of a fuel supply unit in the present disclosure. In the engine 1, furthermore, an ignition device 29 is provided to ignite an air-fuel mixture made of fuel and intake air in the combustion chamber 16.

This engine system is provided with a high-pressure-loop exhaust gas recirculation device (an EGR device) 10. This EGR device 10 is a device configured to allow part of exhaust gas discharged from the combustion chamber 16 of the engine 1 to the exhaust passage 5 to recirculate as exhaust recirculation gas (EGR gas) into the combustion chamber 16. The EGR device 10 includes an exhaust gas recirculation passage (an EGR passage) 17 configured to allow the EGR gas to flow from the exhaust passage 5 to the intake passage 3, and an exhaust gas recirculation valve (an EGR valve) 18 provided in the EGR passage 17 to regulate the flow rate of the EGR gas in the EGR passage 17. The EGR passage 17 is provided between the exhaust passage 5 and the surge tank 3a in the intake passage 3. Specifically, an outlet 17a of the EGR passage 17 is connected to the surge tank 3a downstream of the electronic throttle device 14. An inlet 17b of the EGR passage 17 is connected to the exhaust passage 5 upstream of the catalytic converter 15.

In the EGR passage 17, an EGR cooler 20 is provided to cool the EGR gas flowing through the EGR passage 17. The EGR valve 18 is placed in the EGR passage 17 downstream of the EGR cooler 20.

Configuration of EGR Valve

Figure 2:
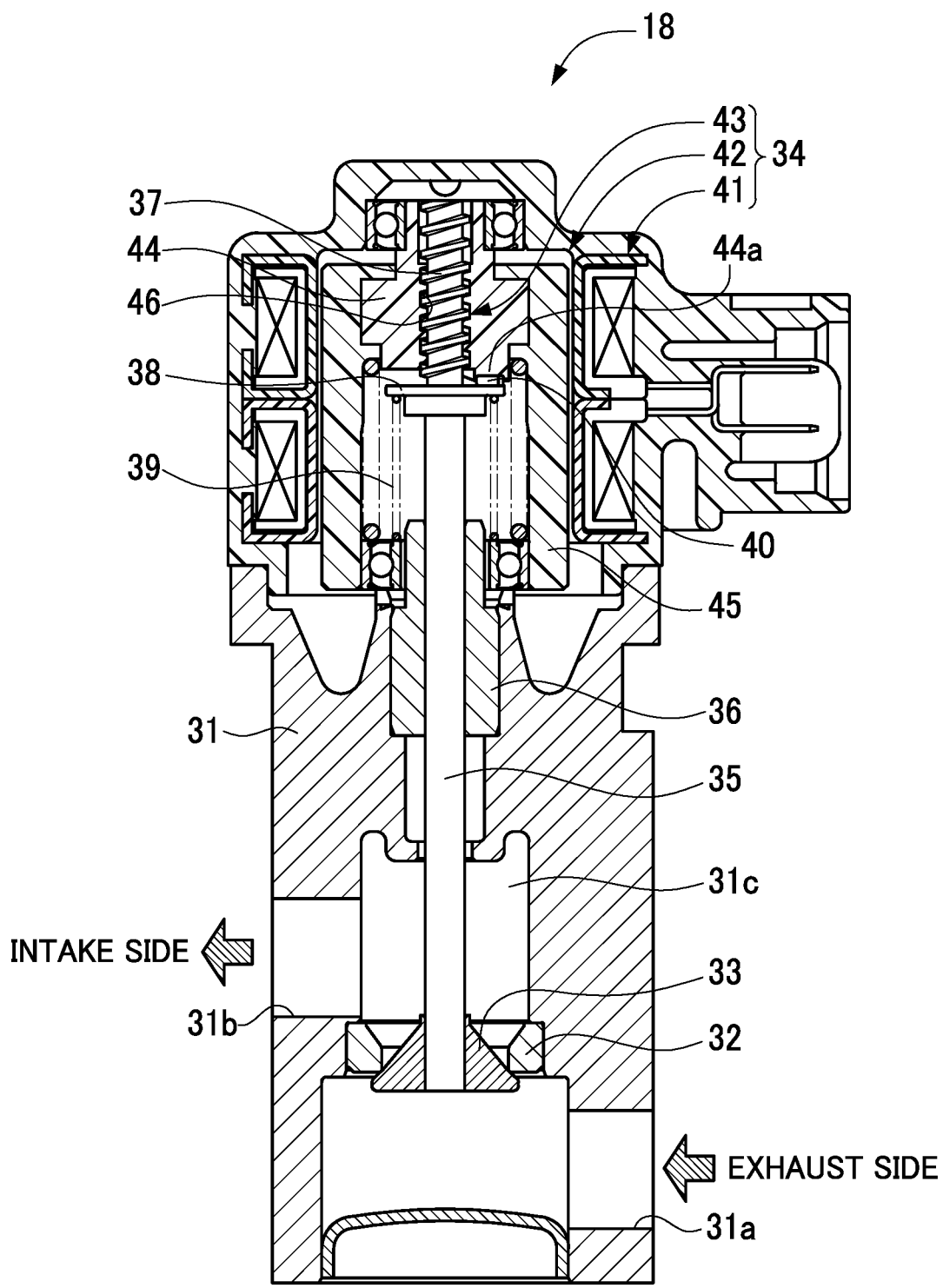
FIG. 2 is a cross-sectional view showing the configuration of an EGR valve in the first embodiment.
Figure 3:
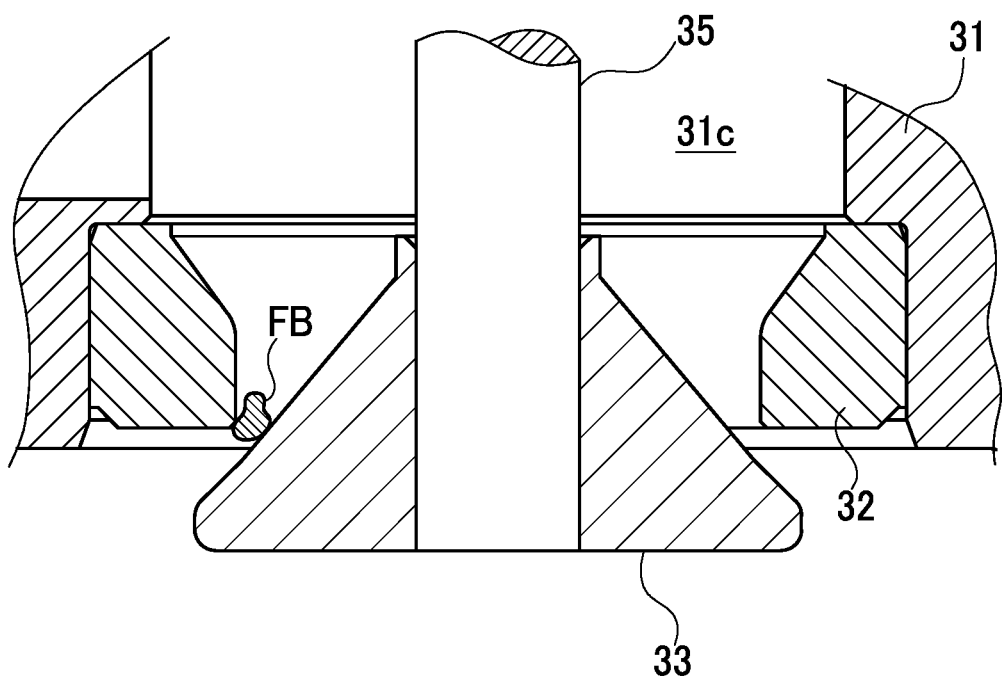
FIG. 3 is an enlarged cross-sectional view showing a part of the EGR valve in the first embodiment.

FIG. 2 is a cross-sectional view showing the configuration of the EGR valve 18. FIG. 3 is an enlarged cross-sectional view showing a part of the EGR valve 18. As shown in FIG. 2, the EGR valve 18 is constituted of a motor-operated poppet valve. Specifically, the EGR valve 18 includes a housing 31, a valve seat 32 provided in the housing 31, a valve element 33 provided to be capable of seating on and moving with respect to the valve seat 32 in the housing 31, and a step motor 34 to perform a stroke movement of the valve element 33. The housing 31 includes an inlet port 31a through which EGR gas flows therein from a side close to the exhaust passage 5 (i.e., an exhaust side), an outlet port 31b through which EGR gas flows out to a side close to the intake passage 3 (i.e., an intake side), and a communication passage 31c to provide communication between the inlet port 31a and the outlet port 31b. The valve seat 32 is placed midway in the communication passage 31c.

The step motor 34 includes an output shaft 35 configured to perform linear reciprocation (stroke movement). The valve element 33 is fixed to a leading end of the output shaft 35. The output shaft 35 is supported to be capable of performing a stroke movement with respect to the housing 31 through a bearing 36 provided in the housing 31. The output shaft 35 is formed, at its upper end, with a male thread part 37. The output shaft 35 is further provided, at its midpoint (near the lower end of the male thread part 37), with a spring rest 38. This spring rest 38 has a lower surface serving as a receiving face for a compression spring 39 and an upper surface with a stopper 40 formed thereon.

The valve element 33 has a conical shape with a conical surface configured to contact with or separate from the valve seat 32. When the valve element 33 contacts with the valve seat 32, the valve element 33 is fully closed. When the valve element 33 separates from the valve seat 32, the valve element 33 is opened. The valve element 33 is urged by the compression spring 39 placed between the spring rest 38 and the housing 31 toward the step motor 34, that is, in a valve closing direction to seat on the valve seat 32. By the stroke movement of the output shaft 35 of the step motor 34, the valve element 33 in a fully-closed state is moved against the urging force of the compression spring 39, thus separating from the valve seat 32. During this valve opening, the valve element 33 is moved toward an upstream side (the exhaust side) of the EGR passage 17. In this EGR valve 18, as above, the valve element 33 is moved from the fully-closed state in which the valve element 33 seats on the valve seat 32 toward the upstream side of the EGR passage 17 against the exhaust pressure or the intake pressure of the engine 1, so that the valve element 33 separates from the valve seat 32 into a valve-open state. On the other hand, the valve element 33 is moved from the valve-open state in the urging direction of the compression spring 39 by the output shaft 35 of the step motor 34, so that the valve element 33 comes near the valve seat 32 and then comes into a valve-closed state. During this valve closing, the valve element 33 is moved toward a downstream side (the intake side) of the EGR passage 17.

In the present embodiment, the output shaft 35 of the step motor 34 is caused to perform a stroke movement to adjust the opening degree of the valve element 33 with respect to the valve seat 32. The output shaft 35 of the EGR valve 18 is provided to be capable of performing a stroke movement by a predetermined stroke from the fully-closed state in which the valve element 33 seats on the valve seat 32 to the fully-open state in which the valve element 33 is most apart from the valve seat 32.

The step motor 34 includes a coil 41, a magnet rotor 42, and a conversion mechanism 43. The step motor 34 is configured such that the magnet rotor 42 is rotated by the predetermined number of motor steps when the coil 41 is excited by energization, thereby causing the conversion mechanism 43 to convert the rotational movement of the magnet rotor 42 to the stroke movement of the output shaft 35. Along with this stroke movement of the output shaft 35, the valve element 33 also makes a stroke movement with respect to the valve seat 32.

The magnet rotor 42 includes a rotor body 44 made of resin and a ring-shaped plastic magnet 45. The rotor body 44 is formed, at its center, with a female thread part 46 which is threadedly mounted on the male thread part 37 of the output shaft 35. When the rotor body 44 is rotated while the female thread part 46 of the rotor body 44 screws together with the male thread part 37 of the output shaft 35, the rotational movement of the rotor body 44 is converted into the stroke movement of the output shaft 35.

Herein, the male thread part 37 and the female thread part 46 constitute the foregoing conversion mechanism 43. The rotor body 44 is formed, on its lower end, with a contact part 44a with which the stopper 40 of the spring rest 38 can abut. During full-closing of the EGR valve 18, the end face of the stopper 40 comes in surface contact with the end face of the contact part 44a to restrict an initial position of the output shaft 35.

In the present embodiment, the number of motor steps of the step motor 34 is changed in stages to thereby adjust the opening degree of the valve element 33 of the EGR valve 18, minutely step by step, from the fully-closed state to the fully-open state.

Electric Configuration of Engine System

The engine system in the present embodiment includes an electric control unit (ECU) 50 responsible for various controls as shown in FIG. 1. The ECU 50 is configured to control the injector 25, the ignition device 29, the electronic throttle device 14 (the DC motor 22), and the EGR valve 18 (the step motor 34) according to the operating state of the engine 1. The ECU 50 is further configured to output predetermined command signals to the motors 34 and 22 to respectively control the EGR valve 18 and the electronic throttle device 14. The ECU 50 includes a central processing unit (CPU), various memories for storing in advance predetermined control programs and others and temporarily storing calculation results of the CPU and others, and an external input circuit and an external output circuit connected to those unit and memories. The ECU 50 corresponds to one example of a controller in the present disclosure. The external output circuit is connected to the injector 25, the ignition device 29, the electronic throttle device 14 (the DC motor 22), and the EGR valve 18 (the step motor 34). The external input circuit is connected to the throttle sensor 23 and additionally various sensors 27 and 51 to 55 to detect the operating state of the engine 1. The various sensors 23, 27, and 51 to 55 correspond to one example of an operating-state detecting unit in the present disclosure.

Herein, as the various sensors, there are provided the throttle sensor 23 and additionally an accelerator sensor 27, an intake pressure sensor 51, a rotation number sensor 52, a water temperature sensor 53, an airflow meter 54, and an air-fuel ratio sensor 55. The accelerator sensor 27 is configured to detect an operation amount of the accelerator pedal 26 as an accelerator opening degree ACC and output a detection signal representative thereof. The intake pressure sensor 51 is configured to detect the pressure in the surge tank 3a located downstream of the electronic throttle device 14 as an intake pressure PM and output a detection signal representative thereof. The intake pressure sensor 51 corresponds to one example of an intake pressure detecting unit. The rotation number sensor 52 is configured to detect a rotation angle (i.e., a crank angle) of a crank shaft 1a of the engine 1 and detect a change in crank angle (i.e., a crank angular velocity) as the number of rotations of the engine 1 (i.e., an engine rotation number) NE, and output a detection signal representative thereof. The rotation number sensor 52 corresponds to a rotation number detecting unit and a crank angular velocity detecting unit in the present disclosure. The water temperature sensor 53 is configured to detect the temperature of cooling water flowing through the inside of the engine 1, as a cooling water temperature THW, and output a detection signal representative thereof. The airflow meter 54 is configured to detect the intake amount Ga of intake air flowing in the intake passage 3 directly downstream of the air cleaner 6 and output a detection signal representative thereof. The air-fuel ratio sensor 55 is configured to detect an air-fuel ratio A/F of exhaust gas in the exhaust passage 5 directly upstream of the catalytic converter 15 and output a detection signal representative thereof.

In the present embodiment, the ECU 50 is configured to control the EGR valve 18 to execute EGR control according to the operating state of the engine 1 in all operation regions of the engine 1. On the other hand, during deceleration of the engine 1, when fuel supply to the engine 1 is cut off (i.e., during deceleration fuel cut), the ECU 50 is configured to control the EGR valve 18 to be fully closed in order to shut off a flow of EGR gas.

Herein, the EGR valve 18 may cause a problem due to lodging or adhering of a foreign-mater FB such as deposits between the valve seat 32 and the valve element 33 as shown in FIG. 3. In the present embodiment, therefore, the ECU 50 is configured to execute "Foreign-matter lodging diagnosis control" to diagnose "abnormality of the EGR valve 18 in opening or closing" including lodging of a foreign matter or substance FB. In the present embodiment, the ECU 50 is also configured to execute "Foreign-matter removal control" to remove a foreign matter FB lodged in the EGR valve 18. In the present embodiment, furthermore, the ECU 50 is configured to execute "During-deceleration engine stall avoidance control" to avoid engine stall and others when a foreign matter FB is lodged in the EGR valve 18 during deceleration of the engine.

Foreign-Matter Lodging Diagnosis Control

Figure 4:
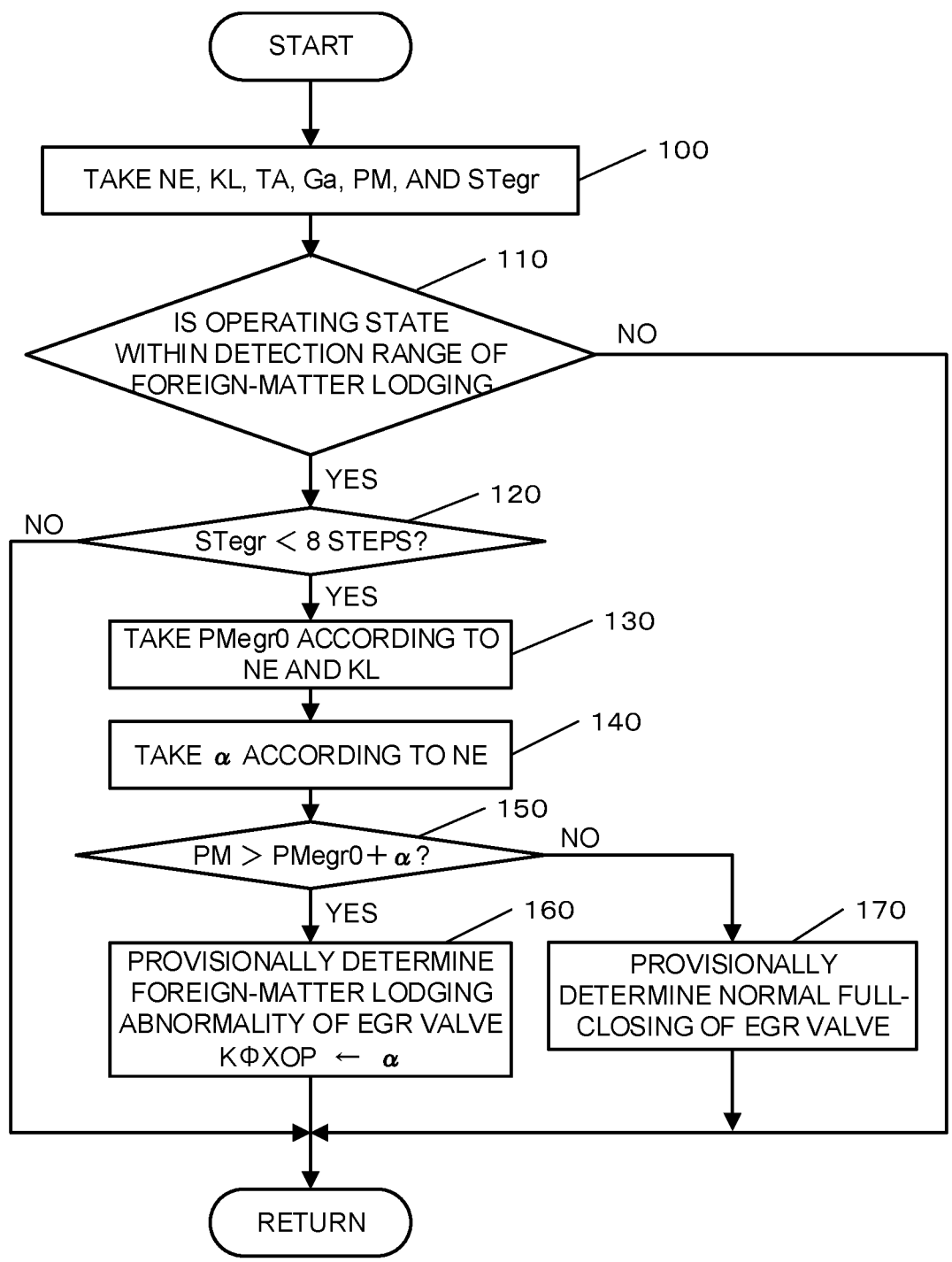
FIG. 4 is a flowchart showing details of foreign-matter lodging diagnosis control in the first embodiment.

The foreign-matter lodging diagnosis control of the EGR valve 18 will be described first. FIG. 4 is a flowchart showing one example of the details of this control. This flowchart shows processing details to diagnose whether or not abnormality due to foreign-matter lodging exists in the EGR valve 18, during deceleration of the engine 1, when the EGR valve 18 is subjected to full-closing control or valve-closing control. The ECU 50 is configured to execute the "Foreign-matter lodging diagnosis control" prior to the other "Foreign-matter removal control" and "During-deceleration engine stall avoidance control".

When the processing enters this routine, in step 100, the ECU 50 first takes various signals representing an operating state of the engine 1 from various sensors and others 23, 51, 52, and 54. Specifically, the ECU 50 takes each of the engine rotation number NE, an engine load KL, the throttle opening degree TA, the intake amount Ga and the intake pressure PM, and the number of motor steps STegr of the step motor 34 corresponding to the opening degree of the EGR valve 18. Herein, the ECU 50 can obtain the engine load KL based on the throttle opening degree TA or the intake pressure PM. Further, the motor step number STegr has a proportional relation to the opening degree of the EGR valve 18 (an EGR opening degree), that is, the opening degree of the valve element 33 relative to the valve seat 32.

In step 110, the ECU 50 determines whether or not the operating state of the engine 1 falls within the foreign-matter lodging detection range. The ECU 50 can judge for example whether or not the range defined based on the relationship between the engine rotation number NE and the engine load KL falls within a predetermined detection range appropriate for foreign-matter lodging detection. This predetermined detection range includes deceleration running or steady running of the engine 1. If this determination result is affirmative, the ECU 50 advances the processing to step 120. If this determination result is negative, the ECU 50 returns the processing to step 100.

In step 120, the ECU 50 determines whether or not the motor step number STegr is smaller than "8 steps". This value, "8 steps", is one example and corresponds to a minute opening degree of the EGR valve 18. If this determination result is affirmative, the ECU 50 advances the processing to step 130. If this determination is negative, the ECU 50 returns the processing to step 100.

Figure 5:
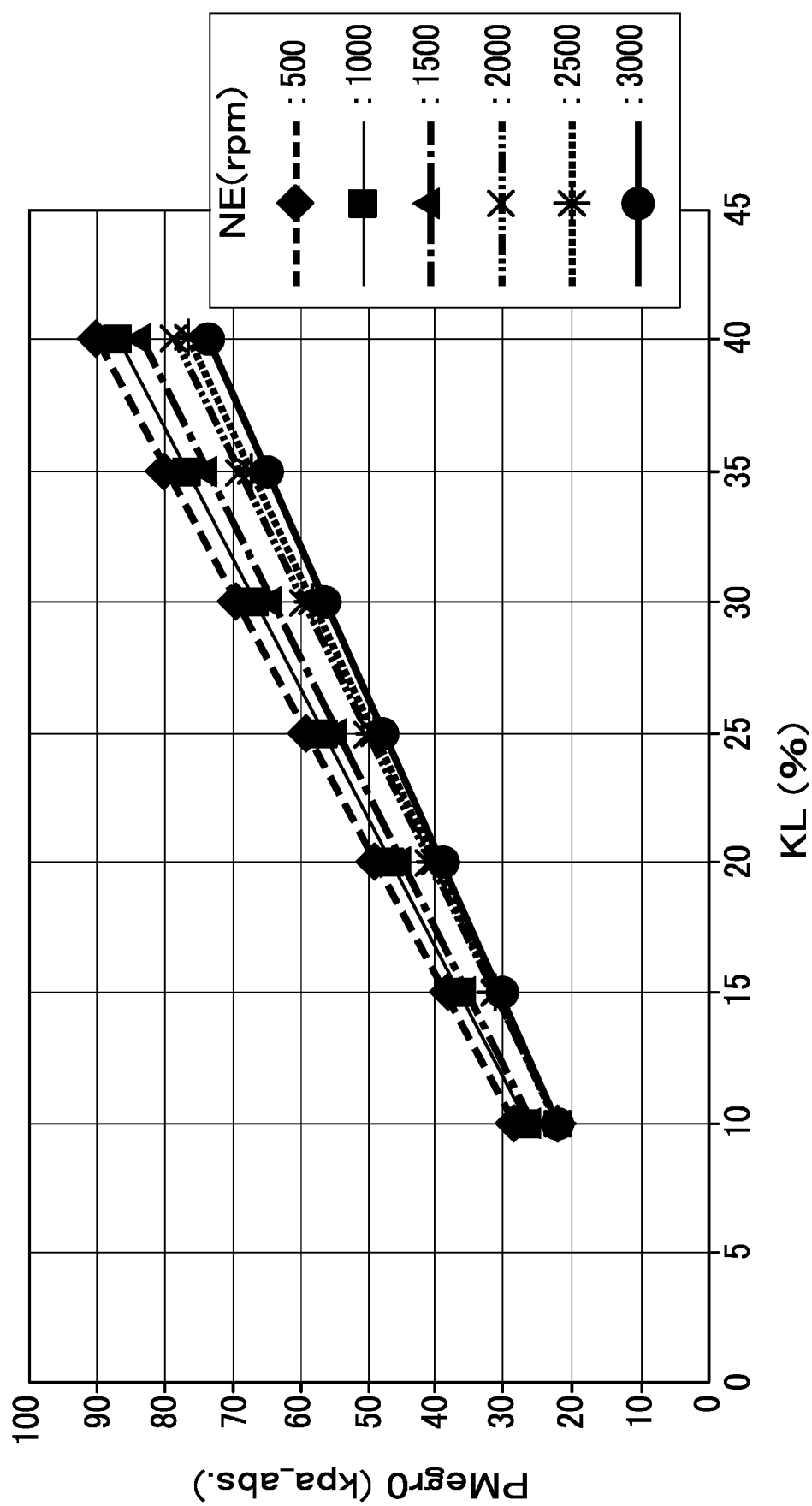
FIG. 5 is a full-closing reference intake pressure map to be referred in order to obtain full-closing reference intake pressure during deceleration according to engine rotation number and engine load in the first embodiment.

In step 130, the ECU 50 takes a full-closing reference intake pressure PMegr0 during deceleration according to the engine rotation number NE and the engine load KL. The ECU 50 can obtain this during-deceleration full-closing reference intake pressure PMegr0 according to the engine rotation number NE and the engine load KL by for example referring to a full-closing reference intake pressure map set in advance as shown in FIG. 5. This full-closing reference intake pressure map is a map previously set to define the relationship of the full-closing reference intake pressure PMegr0 to the engine rotation number NE and the engine load KL when the opening degree of the valve element 33 of the EGR valve 18 (the EGR opening degree) is 0, that is, during full closing. Herein, the intake pressure PM during deceleration of the engine 1 generally intercorrelates with the engine load KL irrespective of the presence or absence of a foreign matter lodged in the EGR valve 18. The intake pressure PM and the engine load KL are almost proportional to each other. However, the intake pressure PM changes according to the engine rotation number NE. In FIG. 5, therefore, the full-closing reference intake pressure PMegr0 is set with respect to the engine rotation number NE and the engine load KL.

In step 140, the ECU 50 then takes a pressure-increase allowance α according to the engine rotation number NE. The ECU 50 can obtain this pressure-increase allowance a by referring to a predetermined map set in advance. This pressure-increase allowance α is added to the full-closing reference intake pressure PMegr0 to permit errors or the like in the determination mentioned later.

In step 150, the ECU 50 then determines whether or not the detected intake pressure PM is larger than a result value obtained by adding up the full-closing reference intake pressure PMegr0 and the pressure-increase allowance α. If this determination result is affirmative, the ECU 50 advances the processing to step 160. If this determination result is negative, the ECU 50 shifts the processing to step 170.

In step 160, the ECU 50 provisionally determines that the EGR valve 18 is abnormal due to foreign-matter lodging (Foreign-matter lodging abnormality) and stores this determination result in a memory. Further, the ECU 50 has stored a map showing a relationship between the diameter of a lodged foreign matter and the pressure increase allowance α that changes with the foreign-matter diameter. In step 160, the ECU 50 determines the existence of the foreign-matter lodging abnormality and obtains a lodged foreign-matter diameter KΦXOP corresponding to the pressure increase allowance α taken in step 140 by referring to the stored map, and stores the obtained lodged foreign-matter diameter in the memory. Thereafter, the ECU 50 returns the processing to step 100.

On the other hand, in step 170, the ECU 50 provisionally determines that the EGR valve 18 has been normally placed in a fully-closed state (Normal valve-closing) and returns the processing to step 100.

According to the foregoing foreign-matter lodging diagnosis control, the ECU 50 is configured to precedently diagnose the abnormality of the EGR valve 18 in opening/closing based on the detected operating state of the engine 1. When it is provisionally determined that the abnormality exists in the EGR valve 18, the ECU 50 is configured to calculate the diameter of the foreign matter FB (the lodged foreign-matter diameter KXOP) lodged between the valve seat 32 and the valve element 33 based on the detected intake pressure PM.

According to the foregoing foreign-matter lodging diagnosis control, when the ECU 50 controls the EGR valve 18 to fully close or to close during deceleration of the engine 1, the ECU 50 is configured to obtain the full-closing reference intake pressure PMegr0 according to the EGR opening degree, engine rotation number NE, and engine load KL by referring to the full-closing reference intake pressure map (the reference function map). Further, the ECU 50 is configured to compare the full-closing reference intake pressure PMegr0 and the detected intake pressure PM to thereby precedently diagnose whether or not the EGR valve 18 is abnormal in opening/closing.

Foreign-Matter Removal Control of EGR Valve

Figure 6:
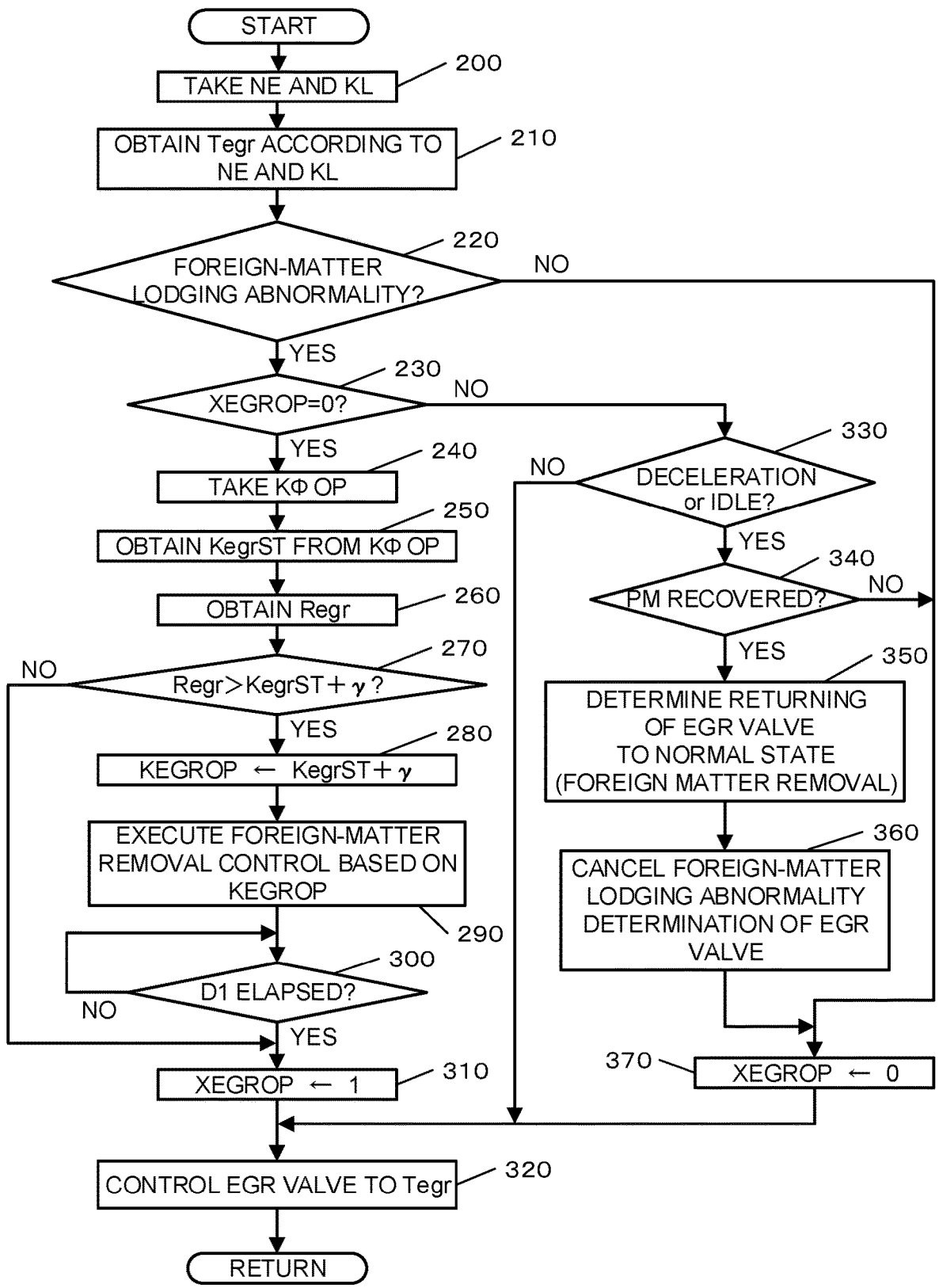
FIG. 6 is a flowchart showing details of foreign matter removal control in the first embodiment.

The following description will be given to the foreign-matter removal control of the EGR valve 18 to be executed subsequently in relation to the foregoing foreign-matter lodging diagnosis control. FIG. 6 is a flowchart showing one example of the details of the control.

When the processing enters this routine, in step 200, the ECU 50 takes the engine rotation number NE and the engine load KL respectively based on detection values of the rotation number sensor 52 and the throttle sensor 23 and others.

In step 210, thereafter, the ECU 50 obtains a target EGR opening degree Tegr of the EGR valve 18 according to the engine rotation number NE and the engine load KL. The ECU 50 can obtain this target EGR opening degree Tegr according to the engine rotation number NE and the engine load KL for example by referring to a predetermined target EGR opening degree map.

In step 220, the ECU 50 then determines whether or not the EGR valve 18 is abnormal due to a foreign matter lodged therein. The ECU 50 can make this determination based on a determination result of the foregoing EGR valve foreign-matter lodging diagnosis control. If this determination result is affirmative, the ECU 50 advances the processing to step 230. If this determination result is negative, the ECU 50 shifts the processing to step 370.

In step 230, the ECU 50 determines whether or not a foreign-matter removal flag XEGROP is 0. This flag XEGROP is set to 1 when the control of removing a foreign matter lodged in the EGR valve 18 (Foreign-matter removal control) is executed. If this determination result is affirmative, the ECU 50 advances the processing to step 240. If this determination result is negative, the ECU 50 shifts the processing to step 330.

In step 240, the ECU 50 takes a foreign-matter diameter equivalent ratio KΦOP. The ECU 50 can obtain this foreign-matter diameter equivalent ratio KΦOP by dividing the intake pressure PM detected during the foreign-matter lodging determination by an intake pressure in a normal state (the full-closing reference intake pressure PMegr0 obtained based on the relationship between the engine rotation number NE and the engine load KL).

In step 250, the ECU 50 then obtains an EGR opening degree KegrST equivalent to a foreign-matter diameter (a foreign-matter diameter equivalent opening degree) based on the foreign-matter diameter equivalent ratio KΦOP. The ECU 50 can obtain this foreign-matter diameter equivalent opening degree KegrST according to the foreign-matter diameter equivalent ratio KΦOP for example by referring to a predetermined foreign-matter diameter equivalent opening degree map.

In step 260, the ECU 50 then obtains an actual EGR opening degree (an actual EGR opening degree) Regr of the EGR valve 18. The ECU 50 can obtain this actual EGR opening degree Regr corresponding to the motor step number STegr of the step motor 34 for example by referring to a predetermined actual EGR opening degree map.

In step 270, the ECU 50 determines whether or not the actual EGR opening degree Regr is larger than a result value obtained by adding a predetermined value γ to the foreign-matter diameter equivalent opening degree KegrST. This predetermined value γ is a constant value to be added to control the EGR valve 18 to an opening degree larger than the foreign-matter diameter equivalent opening degree KegrST. If this determination result is affirmative, the ECU 50 advances the processing to step 280. If this determination result is negative, the ECU 50 shifts the processing to step 310.

In step 280, the ECU 50 sets the result value obtained by the addition of the predetermined value γ to the foreign-matter diameter equivalent opening degree KegrST, as a foreign-matter removal opening degree KEGROP for removal of a foreign matter FB from the EGR valve 18.

In step 290, the ECU 50 then executes the foreign-matter removal control based on the foreign-matter removal opening degree KEGROP. Specifically, the ECU 50 controls the EGR valve 18 from the actual EGR opening degree Regr to the foreign-matter removal opening degree KEGROP. In this case, when a foreign matter FB is lodged between the valve seat 32 and the valve element 33, such a lodging situation is released, so that the foreign matter FB is peeled off or blown away from the valve seat 32 or the valve element 33 by a stream of EGR gas in the EGR passage 17.

In step 300, the ECU 50 waits until a predetermined time D1 elapses and then shifts the processing to step 310.

In step 310 following step 270 or step 300, the ECU 50 sets the foreign-matter removal flag XEGROP to 1.

In step 320, thereafter, the ECU 50 controls the EGR valve 18 to the target EGR opening degree Tegr and returns the processing to step 200.

On the other hand, in step 370 following step 220, the ECU 50 sets the foreign-matter removal flag XEGROP to 0 and shifts the processing to step 320.

In step 330 following step 230, the ECU 50 determines whether the engine 1 operates under deceleration or at idle. The ECU 50 can make this determination for example based on the throttle opening degree TA and the engine rotation number NE. If this determination result is affirmative, the ECU 50 advances the processing to step 340. If this determination result is negative, the ECU 50 shifts the processing to step 320.

In step 340, the ECU 50 further determines whether or not the intake pressure PM has recovered to the intake pressure in a normal state (the full-closing reference intake pressure PMegr0 that can be obtained from the relationship between the engine rotation number NE and the engine load KL). If this determination result is affirmative, the ECU 50 advances the processing to step 350. If this determination result is negative, the ECU 50 shifts the processing to step 370.

In step 350, the ECU 350 determines that the EGR valve 18 has returned to a normal state because of removal of the foreign matter. The ECU 50 can store this determination result in the memory.

In step 360, the ECU 50 cancels the determination of foreign-matter lodging abnormality of the EGR valve 18 and advances the processing to step 370. The ECU 50 can delete for example the foreign-matter lodging abnormality determination stored in the memory.

According to the foregoing foreign-matter removal control, the ECU 50 is configured such that, when it is determined that foreign-matter lodging abnormality exists in the EGR valve 18, the ECU 50 obtains the opening degree equivalent to the diameter of a foreign matter FB lodged between the valve seat 32 and the valve element 33 (the foreign-matter diameter equivalent opening degree KegrST) based on the detected intake pressure PM and the obtained full-closing reference intake pressure PMegr0 and controls the step motor 34 to open the valve element 33 at an opening degree (the foreign-matter removal opening degree KEGROP) larger than the obtained opening degree (the foreign-matter diameter equivalent opening degree KegrST) in order to remove the foreign matter FB from between the valve seat 32 and the valve element 33.

During-Deceleration Engine-Stall Avoidance Control

Figure 7:
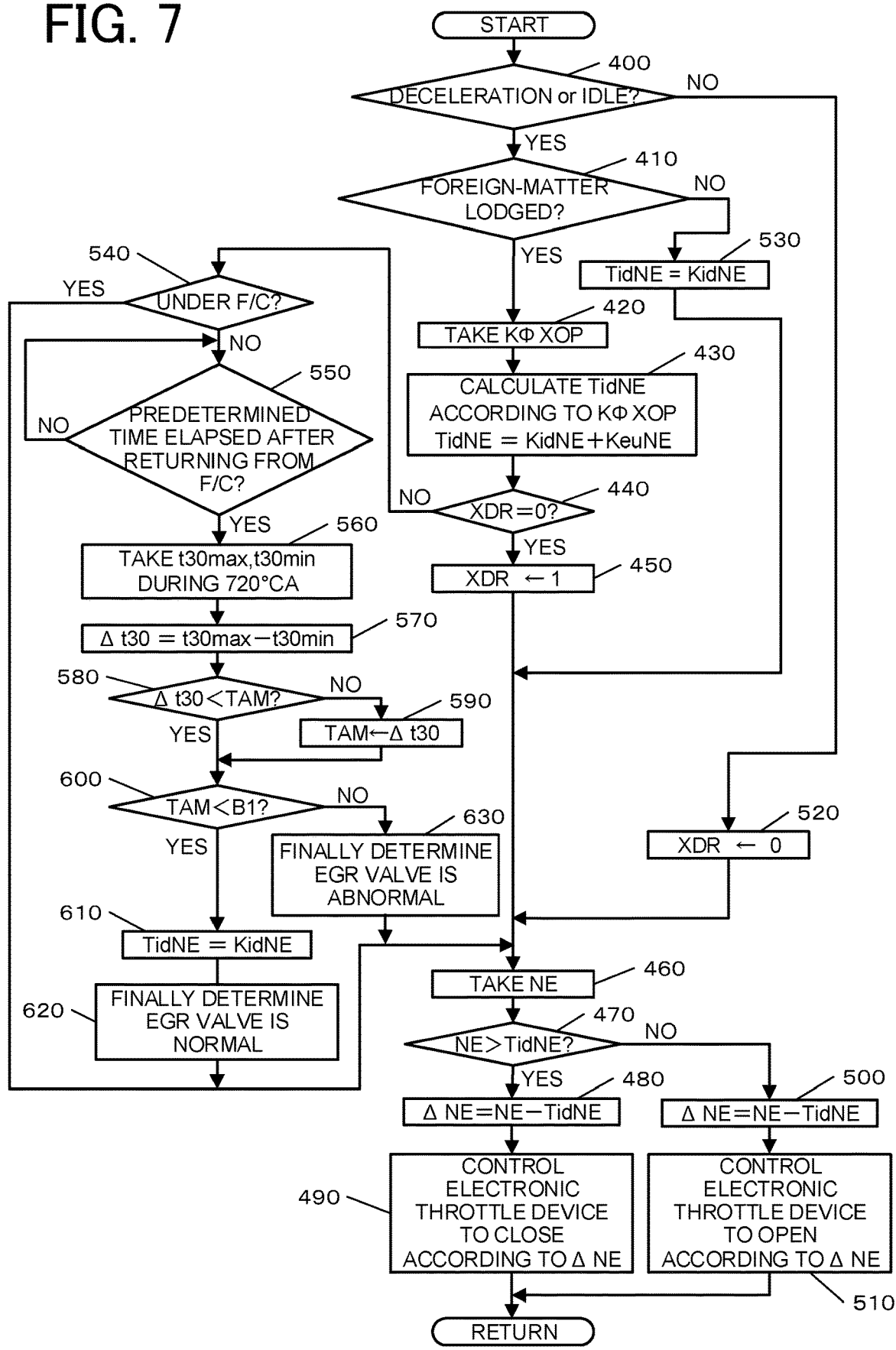
FIG. 7 is a flowchart showing details of engine stall avoidance control during deceleration in the first embodiment.

The following description is given to the during-deceleration engine-stall avoidance control to be executed subsequently in relation to the foregoing foreign-matter lodging diagnosis control. FIG. 7 is a flowchart showing one example of the details of this control. During deceleration of the engine 1, even though the EGR valve 18 has been subjected to full-closing control, if the EGR valve 18 does not completely come to a fully-closed due to a foreign matter FB lodged therein or other causes, EGR gas may leak and flow into the engine 1, thereby causing combustion deterioration (misfire) and engine stall of the engine 1. In the present embodiment, therefore, this during-deceleration engine-stall avoidance control is executed subsequently in relation to the foregoing foreign-matter lodging diagnosis control.

When the processing enters this routine, in step 400, the ECU 500 determines whether the engine 1 operates under deceleration or at idle. The ECU 50 can make this determination for example based on the throttle opening degree TA and the engine rotation number NE. If this determination result is affirmative, the ECU 50 advances the processing to step 410. If this determination result is negative, the ECU 50 advances the processing to step 520.

In step 410, the ECU 50 determines whether or not a foreign matter is lodged in the EGR valve 18. The ECU 50 can this determination based on a provisional determination result in the foregoing foreign-matter lodging diagnosis control. If this determination result is affirmative, the ECU 50 advances the processing to step 420. If this determination result is negative, the ECU 50 advances the processing to step 530.

In step 420, the ECU 50 takes the lodged foreign-matter diameter KΦXOP stored in the foreign-matter lodging diagnosis control.

Figure 8:
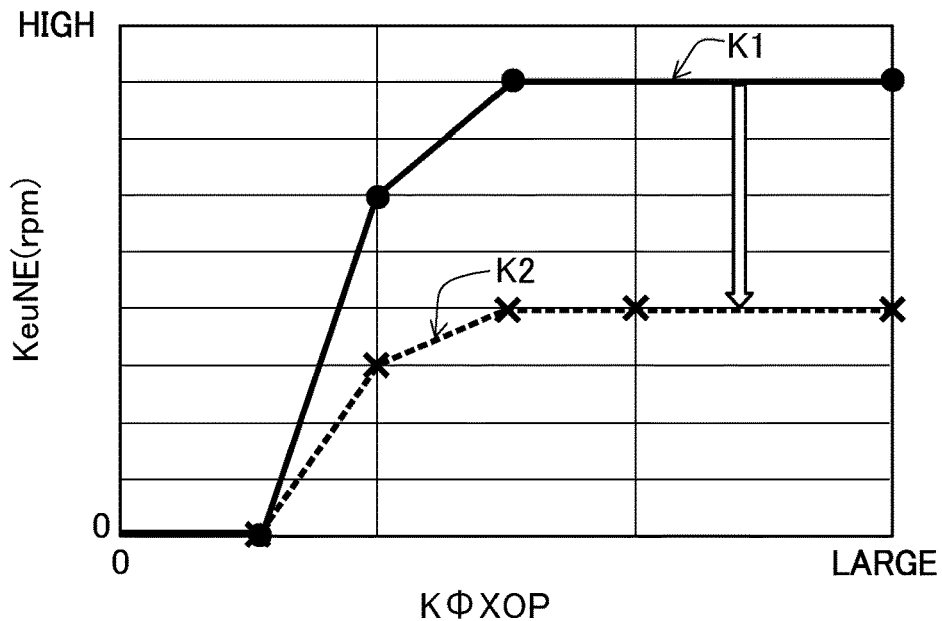
FIG. 8 is an idle-up rotation number map to be referred in order to obtain an idle-up rotation number according to the diameter of a lodged foreign matter in the first embodiment.
Figure 9:
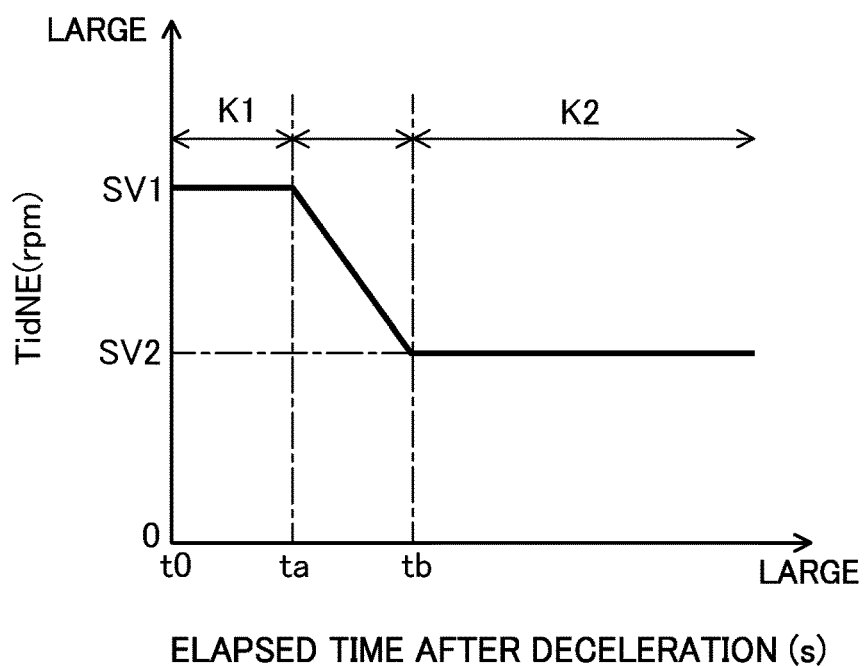
FIG. 9 is a graph showing changes in target idle rotation number according to elapsed time during deceleration in the first embodiment.

In step 430, the ECU 50 then calculates a target idle rotation number TidNE according to the lodged foreign-matter diameter KΦXOP. Specifically, the ECU 50 obtains the target idle rotation number TidNE by adding an idle-up rotation number KeuNE according to the lodged foreign-matter diameter KΦXOP to a predetermined basic idle rotation number KidNE (a fixed value). Herein, the ECU 50 can obtain the idle-up rotation number KeuNE according to the lodged foreign-matter diameter KΦXOP by referring to an idle-up rotation map as shown in FIG. 8. In FIG. 8, a solid line (a thick line) indicates a first increased amount K1 to avoid engine stall and a broken line indicates a second increased amount K2 to maintain idle or improve deceleration performance. The ECU 50 is further configured to change the target idle rotation number TidNE according to an elapsed time after deceleration from when the deceleration is determined, as shown in a graph of FIG. 9. Specifically, as shown in FIG. 9, until time ta is reached after a predetermined time elapses from deceleration start time t0, the ECU 50 sets the target idle rotation number TidNE to a first set value SV1 to avoid engine stall. After the predetermined time has elapsed, that is, at or after time ta, the ECU 50 shifts to a second set value SV2 lower than the first set value SV1. Further, the ECU 50 is configured to keep the first set value SV1 constant for a period from deceleration start time t0 to time ta, keep the second set value SV2 constant from time tb onward (tb>ta), and decrease the first set value SV1 to the second set value SV2 for a period from time ta to time tb. Herein, the ECU 50 obtains the first set value SV1 based on the first increased amount K1 and obtains the second set value SV2 based on the second increased amount K2. The foregoing times ta and tb can be any values.

Herein, the first set value SV1 is a set value that can sufficiently avoid engine stall. However, it is set so as not to limit deceleration of the engine 1 more than necessary. The second set value SV2 is a set value to maintain idle or improve deceleration performance and also a set value that can avoid engine stall. The basic idle rotation number KidNE constituting the target idle rotation number TidNE (the first set value SV1 and the second set value SV2) is not a value that can avoid engine stall by itself.

In step 440, the ECU 50 determines whether or not a deceleration flag XDR is 0. This deceleration flag XDR is set to 1 when the engine 1 has been determined to be under deceleration or at idle or set to 0 when the engine 1 has been determined to be in steady state or under acceleration. If this determination result is affirmative, the ECU 50 advances the processing to step 450. If this determination result is negative, the ECU 50 shifts the processing to step 540.

In step 450, the engine 1 is under deceleration or at idle and thus the ECU 50 sets the deceleration flag XDR to 1.

In step 460, the ECU 50 then takes the engine rotation number NE based on a detection value of the rotation number sensor 52.

In step 470, the ECU 50 then determines whether or not the taken engine rotation number NE is higher than the target idle rotation number TidNE. If this determination result is affirmative, the ECU 50 advances the processing to step 480. If this determination result is negative, the ECU 50 shifts the processing to step 500.

In step 480, the ECU 50 calculates a difference of the target idle rotation number TidNE from an actual engine rotation number NE to obtain a rotation-number difference ΔNE. In this case, the rotation-number difference ΔNE is a positive value.

In step 490, the ECU 50 performs valve-closing control of the electronic throttle device 14 according to the rotation-number difference ΔNE. In other words, the ECU 50 controls the electronic throttle device 14 to be closed to reduce the engine rotation number NE toward the target idle rotation number TidNE. Thereafter, the ECU 50 returns the processing to step 400.

In step 500, on the other hand, the ECU 50 calculates a difference of the target idle rotation number TidNE from the actual engine rotation number NE to obtain the rotation-number difference ΔNE. In this case, the rotation-number difference ΔNE is a negative value.

In step 510, the ECU 50 performs valve-opening control of the electronic throttle device 14 according to the rotation-number difference ΔNE. In other words, the ECU 50 controls the electronic throttle device 14 to be opened to increase the engine rotation number NE toward the target idle rotation number TidNE. Thereafter, the ECU 50 returns the processing to step 400.

On the other hand, in step 520 following step 400, the engine 1 is in steady state or under acceleration and thus the ECU 50 sets the deceleration flag XDR to 0 and shifts the processing to step 460.

In step 530 following step 410, furthermore, the ECU 50 obtains the basic idle rotation number KidNE as the target idle rotation number TidNE and shifts the processing to step 460. This target idle rotation number TidNE does not include the idle-up rotation number KeuNE and thus this target idle rotation number TidNE is a value that is lower than the target idle rotation number TidNE used for the engine stall avoidance control (the idle-up control) and does not contribute to idle-up, that is, a value that cancels idle-up.

In step 540 following step 440, furthermore, the ECU 50 determines whether or not the engine 1 is under fuel cut (F/C), that is, whether or not fuel injection from the injector 25 is interrupted in association with deceleration. If this determination result is affirmative, the ECU 50 advances the processing directly to step 460. If this determination result is negative, the ECU 50 shifts the processing to step 550.

In step 550, the ECU 50 waits until a predetermined time elapses after returning the operation from fuel cut (F/C) to fuel supply, and then advances to step 560. This predetermined time corresponds to a waiting time period until the rotation of the engine 1 becomes stable after returning from fuel cut.

Figure 10:
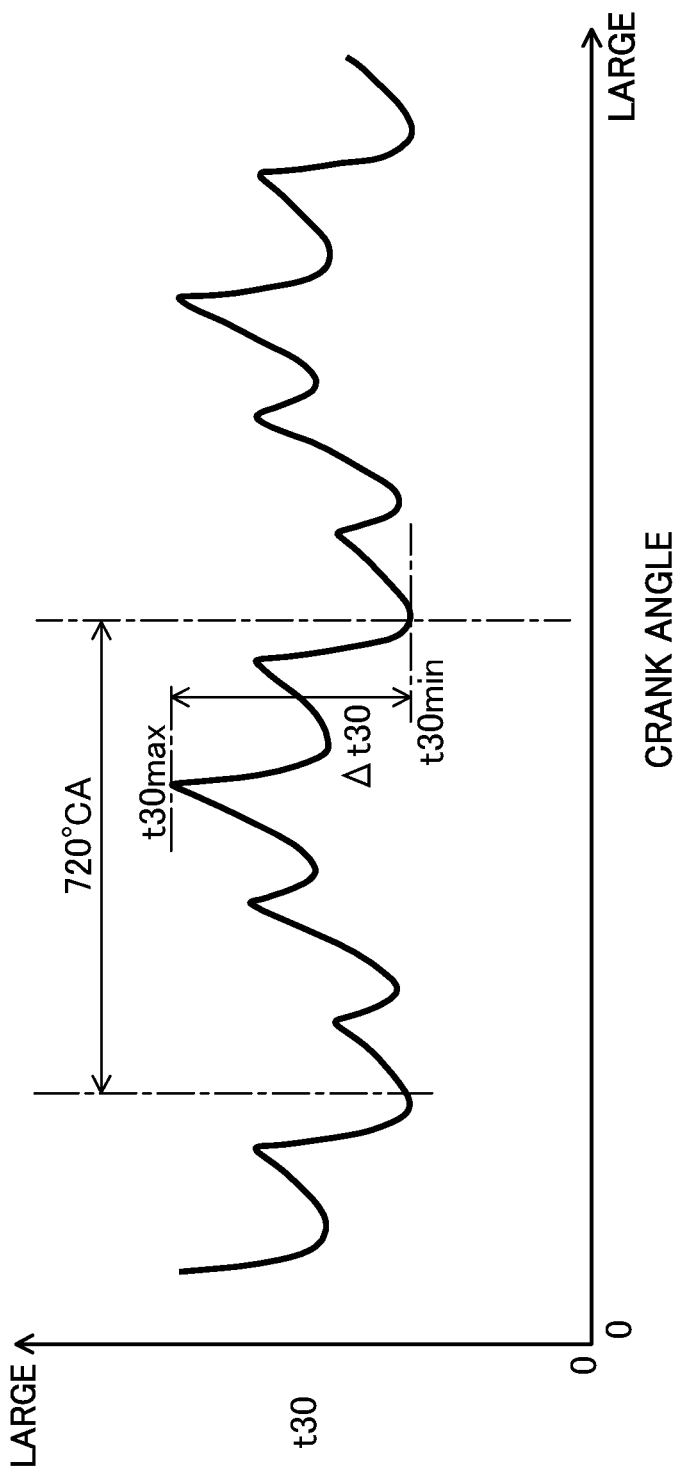
FIG. 10 is a graph showing a 30°-time (t30) and others taken every time a crank angle advances 30° in the first embodiment.

In step 560, the ECU 50 further takes a maximum 30°-time t30max and a minimum 30°-time t30min during 720° CA (i.e., while the crankshaft 1a rotates twice). Herein, the maximum 30°-time t30max and the minimum 30°-time t30min are detection values detected by the rotation number sensor 52 and respectively denote a maximum value and a minimum value of the time required for advancement of the crank angle by every 30° (a 30°-time t30) as plotted in a graph in FIG. 10.

In step 570, the ECU 50 calculates a 30°-time maximum difference Δt30. Specifically, the ECU 50 obtains the 30°-time maximum difference Δt30 shown in FIG. 10 by subtracting the minimum 30°-time t30min from the maximum 30°-time t30max.

Figure 11:
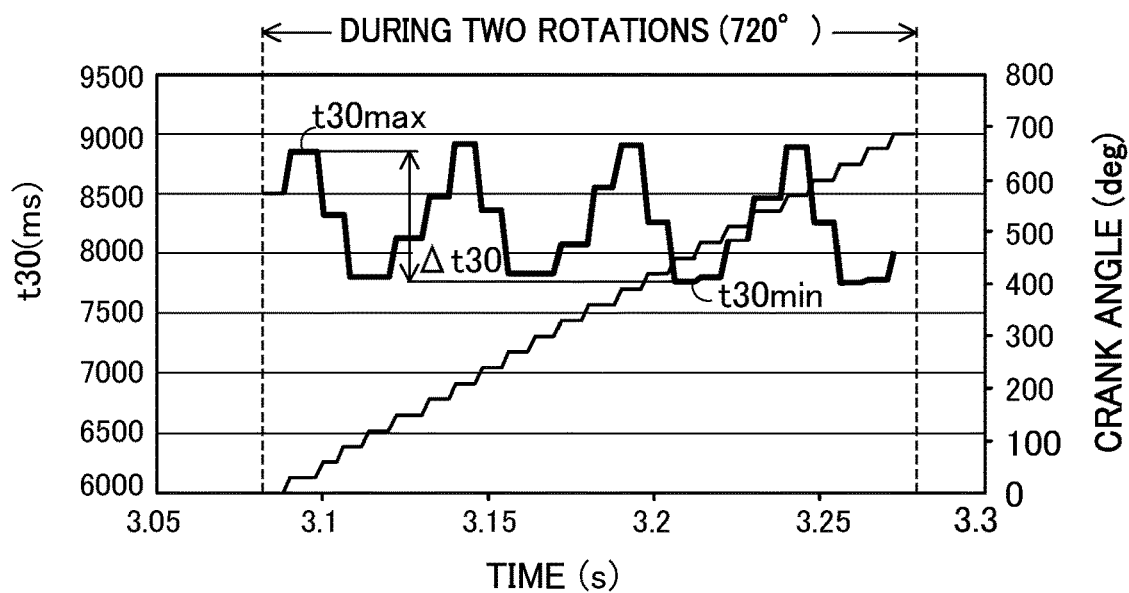
FIG. 11 is a graph showing changes in 30°-time and crank angle in a normal state in the first embodiment.
Figure 12:
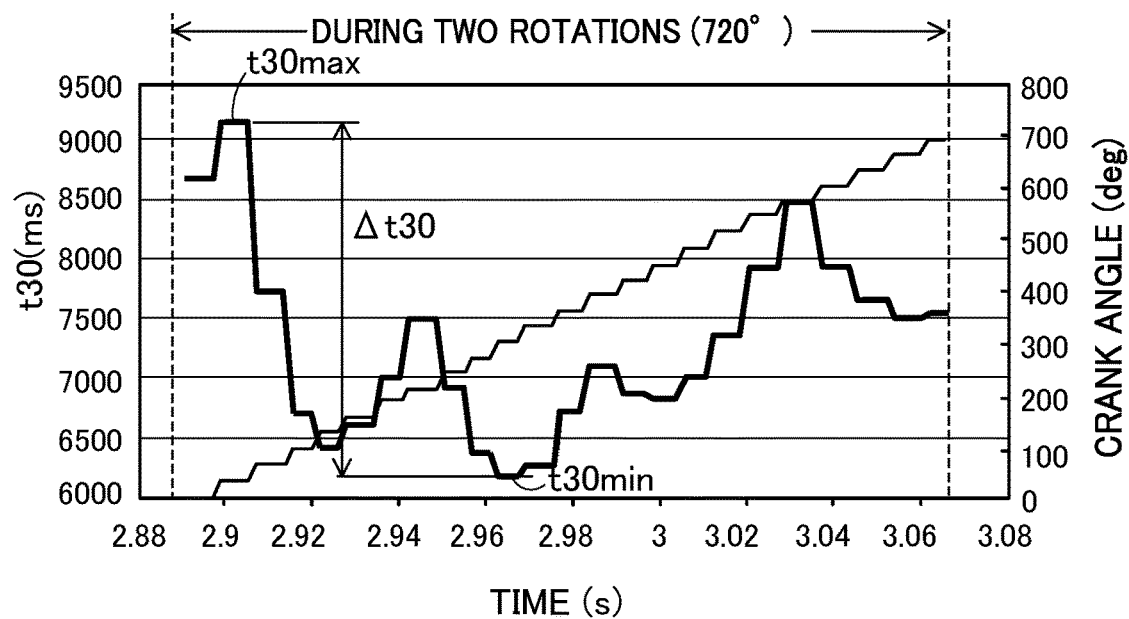
FIG. 12 is a graph showing changes in 30°-time and crank angle in an abnormal state in the first embodiment.

Herein, the 30°-time maximum difference Δt30 denotes the level of rotation fluctuation of the crankshaft 1a. When this difference is a relatively small value, and a variation between two continuous values is relatively small as shown in FIG. 11, it represents that the rotation fluctuation of the crankshaft 1a is small. When the difference is a relatively large value and a variation between two continuous values is relatively large as shown in FIG. 12, it represents that the rotation fluctuation of the crankshaft 1a is large. Further, this rotation fluctuation reflects a combustion state of air-fuel mixture in each cylinder of the engine 1. When this difference is large, it represents that the combustion state is unstable (misfire and engine stall are likely to occur). When the difference is small, it represents that the combustion state is stable (misfire and engine stall are unlikely to occur). FIG. 11 is a graph showing changes in the 30°-time t30 in normal state (a thick line) and crank angle (a solid line). FIG. 12 is a graph showing changes in the 30°-time t30 in abnormal state (a thick line) and crank angle (a solid line).

In step 580, the ECU 50 determines whether or not the 30°-time maximum time difference Δt30 is smaller than a predetermined maximum value TAM. If this determination result is negative, the ECU 50 shifts the processing directly to step 590. If this determination result is affirmative, the ECU 50 advances the processing to step 600.

In step 590, the ECU 50 sets the currently obtained 30°-time maximum time difference Δt30 as the maximum value TAM.

In step 600 following step 580 or step 590, the ECU 50 determines whether or not the maximum value TAM is smaller than a predetermined B1. Herein, the predetermined value B1 is a threshold value for determining combustion deterioration (misfire). When the maximum value TAM is less than the predetermined value B1, it is determined that no combustion deterioration (no misfire) exists (normality). When the maximum value TAM is equal to or larger than the predetermined value B1, it is determined that combustion deterioration (misfire) exists (abnormality). If this determination result is affirmative, the ECU 50 advances the processing directly to step 610. If this determination result is negative, the ECU 50 shifts the processing to step 630.

In step 630, the ECU 50 finally determines that the EGR valve 18 is abnormal (in foreign-matter lodging) and thus advances the processing to step 460 to continue the engine stall avoidance control (the idle-up control). The ECU 50 can store this determination result in the memory.

In step 610, in contrast, the ECU 50 obtains the basic idle rotation number KidNE as the target idle rotation number TidNE in order to cancel the engine stall avoidance control (the idle-up control). This target idle rotation number TidNE does not include the idle-up rotation number KeuNE and this target idle rotation number TidNE is a value that is lower than the target idle rotation number TidNE used during fuel cut and does not contribute to idle-up, that is, a value that cancels idle-up.

In step 620, the ECU 50 then finally determines that the EGR valve 18 is normal (in foreign-matter lodging) and advances the processing to step 460. The ECU 50 can store this determination result in the memory.

According to the foregoing during-deceleration engine-stall avoidance control, the ECU 50 is configured to diagnose the abnormality of the EGR valve 18 in opening/closing between the valve seat 32 and the valve element 33 based on the detected operating state during deceleration of the engine 1 and further configured to diagnose the presence or absence of misfire in the engine 1 based on the detected operating state when fuel is supplied by the injector 25 to the engine 1 during deceleration of the engine 1. To be concrete, the ECU 50 is configured to diagnose whether or not misfire is present in the engine 1 based on a change (30°-time maximum difference Δt30) of the detected crank angle (30°-time t30). Further, the ECU 50 is configured to control the output adjusting unit (the electronic throttle device 14) to perform the predetermined engine stall avoidance control when it is provisionally determined that the abnormality exists. When it is subsequently determined that misfire exists, the ECU 50 is further configured to finally determine that the abnormality exists and continue the engine stall avoidance control. Alternatively, when it is subsequently determined that no misfire exists, the ECU 50 is further configured to finally determine that the abnormality does not exist and cancel the engine stall avoidance control.

According to the foregoing during-deceleration engine stall avoidance control, the ECU 50 is also configured to feedback-control the electronic throttle device 14 so that the detected engine rotation number NE reaches the predetermined target idle rotation number TidNE and further to execute the idle-up control, as the engine stall avoidance control, in which the target idle rotation number TidNE is set to a predetermined first set value SV1 for avoiding engine stall until a predetermined time elapses from the start of deceleration.

Figure 13:
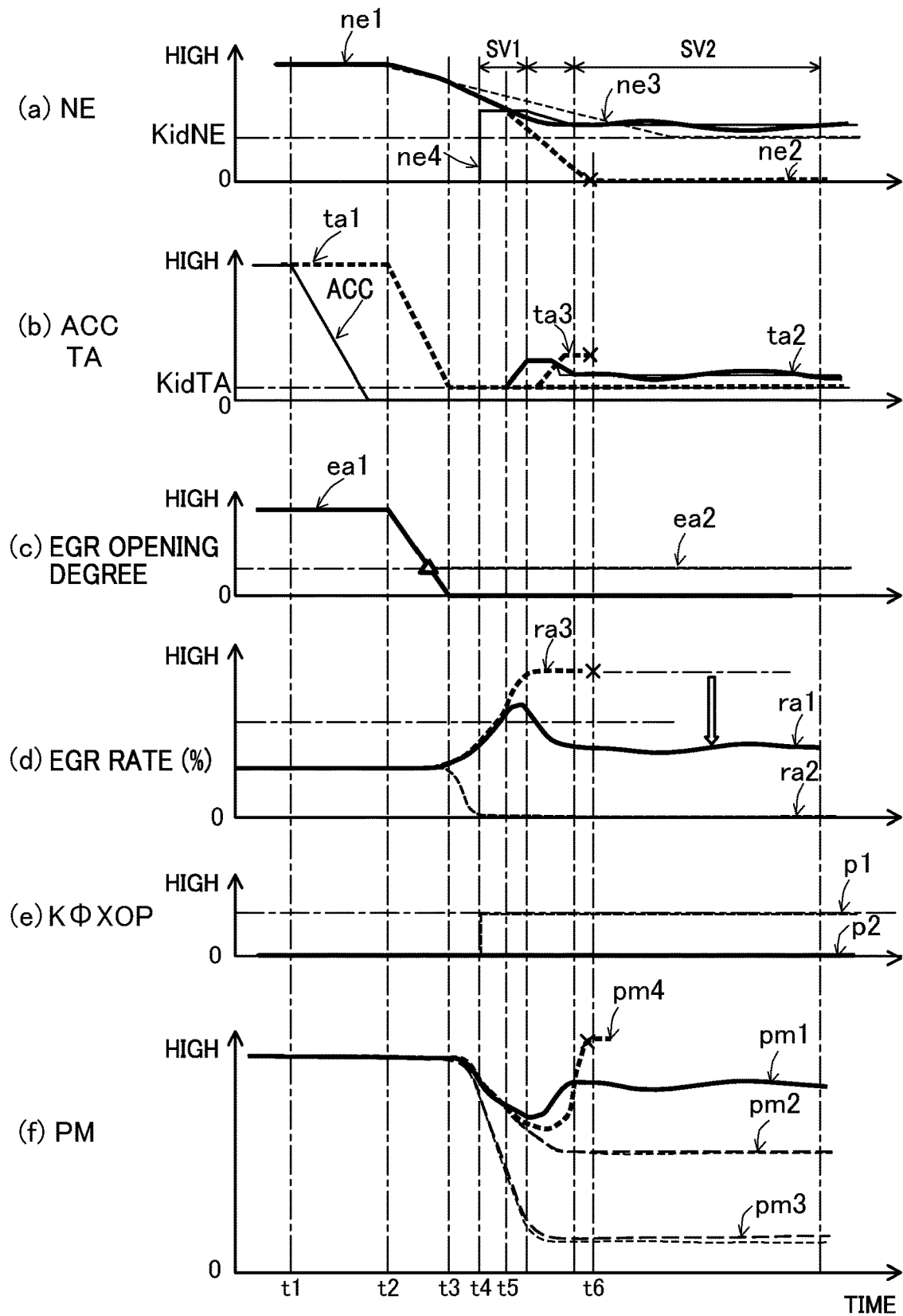
FIG. 13 is a time chart showing behaviors of various parameters during execution of during-deceleration engine stall avoidance control in the first embodiment.

Herein, FIG. 13 is a time chart showing behaviors of various parameters during execution of the foregoing during-deceleration engine stall avoidance control. In FIG. 13, (a) indicates the engine rotation number NE, (b) represents the accelerator opening degree ACC and the throttle opening degree TA, (c) indicates the EGR opening degree, (d) indicates the EGR rate, (e) represents the lodged foreign-matter diameter KΦXOP, and (f) indicates the intake pressure PM.

In FIG. 13 (a), a thick line ne1 represents a case where the present control, i.e. the idle-up control, is executed when the foreign-matter lodging exists, a thick broken line ne2 shows a case where the present idle-up control is not executed when the foreign-matter lodging exists, a broken line ne3 indicates a case where the present idle-up control is not executed when the foreign-matter lodging does not exist, and a solid line ne4 shows the target idle rotation number TidNE when foreign-matter lodging exists.

In FIG. 13 (b), a solid line represents the accelerator opening degree ACC, a thick broken line ta1 shows the throttle opening degree when the present idle-up control is not executed when the foreign-matter lodging does not exist, a thick broken line ta2 represents the throttle opening degree in a case where the present idle-up control is executed when the foreign-matter lodging exists, and a broken line ta3 indicates the throttle opening degree in a case where the present idle-up control is delayed.

In FIG. 13 (*c*), a thick line ea1 represents a case where the EGR valve 18 normally operates and a thick broken line ea2 shows a case where foreign-matter lodging exists in the EGR valve 18.

In FIG. 13 (*d*), a thick line ra1 represents a case where the present idle-up control is executed when foreign-matter lodging exists, a thick broken line ra2 shows a case where the present idle-up control is not executed when foreign-matter lodging does not exist, and a broken line ra3 indicates a case where the present idle-up control is not executed when foreign-matter lodging exists.

In FIG. 13 (*e*), a broken line p1 represents a case where foreign-matter lodging exists and a thick line p2 shows a case where no foreign-matter lodging exists.

In FIG. 13 (*f*), a thick line pm1 represents a case where the present idle-up control is executed when foreign-matter lodging exists, a thick broken line pm2 shows a case where the present idle-up control is not executed when foreign-matter lodging exists, a thick broken line pm3 indicates a case where the present idle-up control is not executed when no foreign-matter lodging exists, and a thick broken line pm4 shows a case where the present idle-up control is not executed when foreign-matter lodging exists.

In FIG. 13, when the accelerator opening degree ACC in (b) starts to decrease (a deceleration request is entered) at time t1, the throttle opening degree TA in (b) and the EGR opening degree in (c) each start to decrease at time t2 slightly later than time t1. In other words, the electronic throttle device 14 and the EGR valve 18 each start to close. Then, at time t3, the throttle opening degree TA in (b) reaches a predetermined deceleration opening degree (the basic idle opening degree KidTA and the EGR opening degree in (c) becomes full-close. However, if foreign-matter lodging exists in the EGR valve 18 just before time t3 (a triangular mark), the EGR opening degree remains open at a certain opening degree as shown by the broken line ea2 in (c).

Thereafter, when it is finally determined that a foreign matter is lodged in the EGR valve 18 as indicated by the broken line p1 in (e) at time t4 based on the provisional determination that the foreign-matter lodging exists and the subsequent determination that the misfire is present, the engine stall avoidance control (the idle-up control) is executed by the present control, so that the target idle rotation number TidNE becomes the first set value SV1 as indicated by the solid line ne4 in (a). Accordingly, when the actual engine rotation number NE goes below the target idle rotation number TidNE at time t5 as indicated by the thick line ne1 in (a), the subsequent throttle opening degree TA is controlled as indicated by the thick line ta2 in (b) and the engine rotation number NE is controlled to converge to the target idle rotation number TidNE as shown by the thick line ne1 in (a). As indicated by the thick line pm1 in (f), therefore, the intake pressure PM having started to decrease at or after time t3 rises by idle-up and then becomes nearly constant. In association with this, as indicated by the thick line ra1 in (d), the EGR rate having increased once at or after time t3 decreases by idle-up and then becomes nearly constant as indicated. The rise in EGR rate is suppressed during deceleration of the engine 1 in the above manner, so that the engine stall of the engine 1 can be avoided.

On the other hand, when idle-up to the target idle rotation number TidNE is not performed at or after time t4, the EGR ratio increases afterward up to the maximum as plotted by the thick broken line ra3 in FIG. 13 (*d*) and the intake pressure PM turns afterward from decrease to increase as indicated by the thick broken line pm4 in (f), and the engine rotation number NE becomes 0 at time t6 as indicated by the thick broken line ne2 in (a), leading to engine stall as indicated by a cross mark. When idle-up to the target idle opening degree TidTA is delayed, the intake pressure PM and the EGR ratio similarly change at or after time t4, thus leading to engine stall, as indicated by the thick broken line ta3 in FIG. 13 (*b*).

Operations and Effects of the Engine

According to the engine system in the present embodiment described above, during deceleration of the engine 1, it is diagnosed whether or not the abnormality of the EGR valve 18 is abnormal in opening/closing between the valve seat 32 and the valve element 33 based on the detected operating state (the intake pressure PM) and also, when fuel is supplied by the injector 25 to the engine 1 during deceleration of the engine 1, it is diagnosed whether or not combustion deterioration exists in the engine 1 based on the detected operating state (a change in crank angular velocity). Further, when it is provisionally determined that the abnormality exists in the EGR valve 18, the output adjusting unit (the electronic throttle device 14) is controlled to perform the predetermined engine stall avoidance control (the idle-up control). This enables early countermeasures to avoid engine stall if the EGR valve 18 does not completely come to a fully-closed state due to foreign matter lodging or other causes, which may cause EGR gas to flow and leak to intake air. When it is subsequently determined that combustion deterioration exists, the EGR valve 18 is finally determined to be abnormal and also the engine stall avoidance control is continued. This can provide a correct diagnosis result that the EGR valve 18 is abnormal and thus effectively avoid engine stall. Alternatively, when it is subsequently determined that no combustion deterioration exists, the EGR valve 18 is finally determined not to be abnormal and also the engine stall avoidance control is canceled. This can provide a correct diagnosis result that the EGR valve 18 has no abnormality, that is, is normal, and thus prevent unnecessary execution of the engine stall avoidance control. Thus, the abnormality that the EGR valve 18 does not completely come to a fully-closed state due to foreign-matter lodging or other causes can be early detected during deceleration of the engine 1 and hence the engine stall avoidance control can be early executed and additionally erroneous detection of the abnormality of the EGR valve 18 and unnecessary execution of the engine stall avoidance control can be prevented. Even if the EGR valve 18 is provisionally determined to be abnormal and the engine stall avoidance control (the idle-up control) is executed early, such execution of the engine stall avoidance control will cause no deterioration in deceleration property of the engine 1 as long as it only takes a split second (a short time) until no abnormality is finally determined, and therefore it is not problematic.

According to the configuration of the present embodiment, if combustion deterioration (misfire) leading to engine stall exists in the engine 1, this is reflected in changes in the crank angular velocity of the engine 1. Thus, since whether or not the combustion deterioration exists in the engine 1 is diagnosed based on changes in the detected crank angular velocity (the 30°-time t30), this can appropriately determine whether or not the combustion deterioration leading to engine stall exists. Accordingly, ascertaining of special behaviors of the crank angular velocity (the 30°-time t30) to the EGR valve 18 in which abnormality exists can make sure to perform the abnormality diagnosis of the EGR valve 18.

According to the configuration of the present embodiment, furthermore, if it is subsequently determined that no combustion deterioration exists in the engine 1, the engine stall avoidance control (idle-up control) is canceled, so that unnecessary engine stall avoidance control (idle-up control) is not performed. Therefore, even when the EGR valve 18 is provisionally determined to be abnormal, the engine 1 can be promptly returned from the idle-up control for avoiding engine stall to the normal idle control. This can prevent abrupt (protruding) changes in the engine rotation number NE under the idle-up control.

According to the configuration of the present embodiment, the electronic throttle device 14 is subjected to the feedback control so that the detected engine rotation number NE reaches a predetermined target idle rotation number TidNE. Herein, as the engine stall avoidance control, the target idle rotation number TidNE is a predetermined set value SV1 for avoiding engine stall until a predetermined time elapses from the start of deceleration. Accordingly, even when the EGR valve 18 is not completely fully closed due to a foreign matter lodged therein, causing EGR gas to flow into intake air, the engine 1 is idled up until the first set value SV1 for avoiding engine stall. Thus, engine stall is avoided. This can prevent a delay in increasing intake air due to idle-up at an early stage of deceleration of the engine 1 and hence make sure to avoid engine stall at the early stage of deceleration.

According to the configuration of the present embodiment, when the EGR valve 18 is determined to be abnormal in opening/closing (Foreign-matter lodging abnormality) by the predetermined foreign-matter lodging diagnosis control, the diameter of a lodged foreign matter FB (the lodged foreign-matter diameter KΦXOP) is calculated based on the detected intake pressure PM. Further, the first set value SV1 for the target idle rotation number TidNE is calculated based on the detected diameter. If the EGR valve 18 has a foreign matter FB lodged therein, causing EGR gas to leak into intake air, the target idle rotation number TidNE is the first set value SV1 according to the diameter of the foreign matter FB at the deceleration early stage, so that the engine 1 is idled up in a necessary and sufficient manner to avoid engine stall. This can prevent deterioration in deceleration performance while avoiding engine stall at the deceleration early stage of the engine 1.

According to the configuration of the present embodiment, if the EGR valve 18 is determined to be abnormal as with the above case, a second set value SV2 for the target idle rotation number TidNE is calculated based on the diameter of a foreign matter FB (the lodged foreign-matter diameter KΦXOP). Therefore, if the EGR valve 18 has a foreign matter FB lodged therein, causing EGR gas to leak into intake air, the target idle rotation number TidNE is set to the first set value SV1 and thereafter changed to the second set value SV2 according to the diameter of the foreign matter FB. The idle-up operation is reduced by one stage to a necessary and sufficient level. This can prevent the occurrence of an idle running feeling of the engine 1 (a feeling of strangeness that the engine 1 does not decelerate against a request from a driver) at a later stage of deceleration of the engine 1.

The present embodiment assumes the full-closing abnormality due to lodgment of a foreign matter FB as the abnormality of the EGR valve 18 in opening/closing, but may assume the abnormality that the valve element 33 could not be fully closed due to sticking or other causes, not limited to due to lodgment of a foreign matter FB.

According to the configuration of the present embodiment, when the EGR valve 18 is determined to be abnormal and further during fuel cut, for example, the foreign matter removal control shown in FIG. 6 may be performed so that the valve element 33 is opened at an opening degree larger than an opening degree corresponding to the diameter of the foreign matter FB, thereby removing the foreign matter FB lodged between the valve seat 32 and the valve element 33. This control enables the EGR valve 18 to promptly return from an abnormal state due to foreign-matter lodging to a normal state. In this regard, the engine 1 can avoid combustion deterioration and engine stall.

Second Embodiment

A second embodiment embodying the engine system as a gasoline engine system will be described in detail with reference to the accompanying drawings.

In the following description, identical or similar components to those in the first embodiment are assigned the same reference signs as in the first embodiment. The following description will be given with a focus on differences from the first embodiment.

Figure 14:
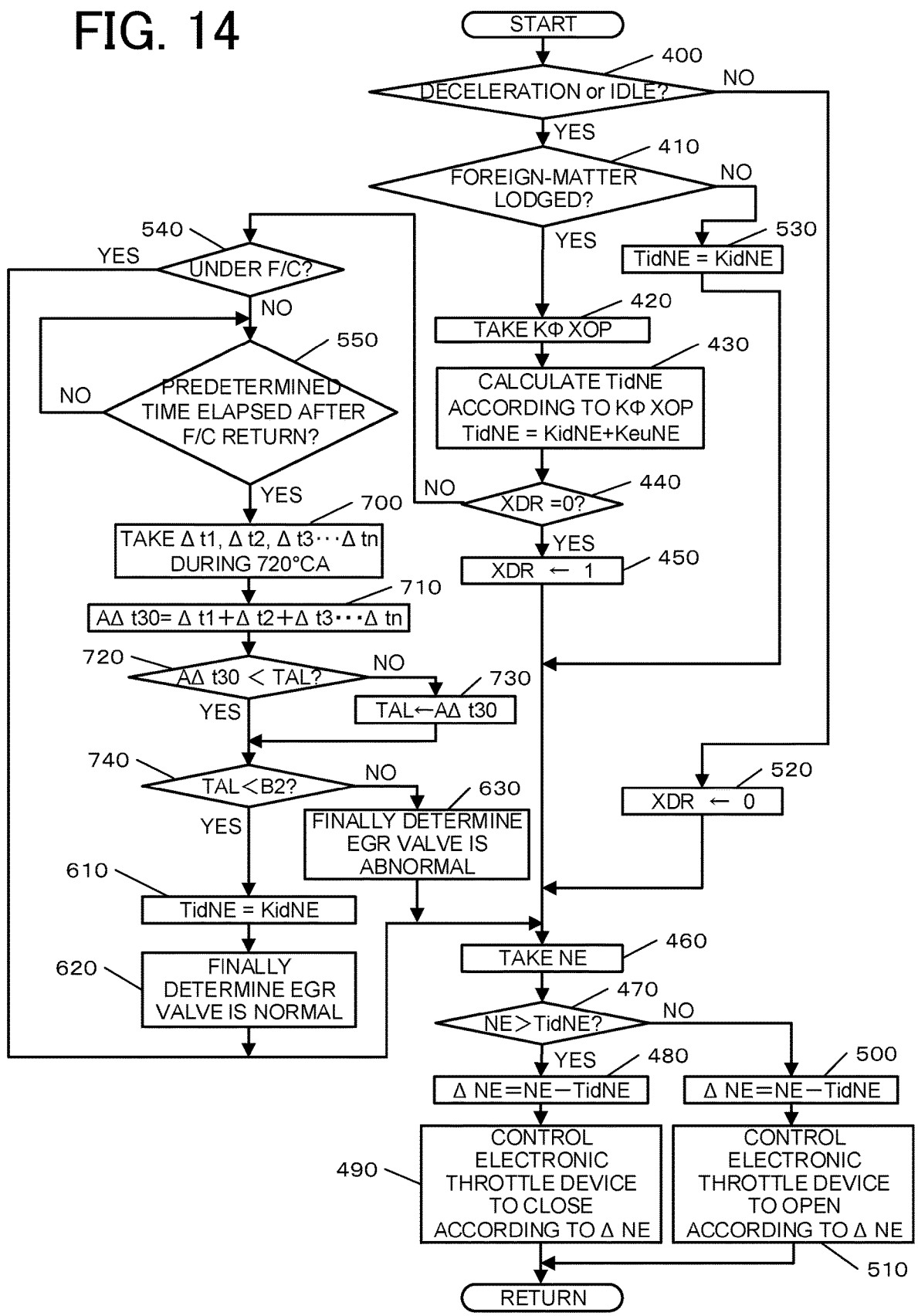
FIG. 14 is a flowchart showing details of a during-deceleration engine stall avoidance control in a second embodiment.

The present embodiment differs in configuration from the first embodiment in relation to the contents of the during-deceleration engine-stall avoidance control. FIG. 14 is a flowchart showing the control contents. The flowchart in FIG. 14, differing from FIG. 7, includes the processings in step 700 to step 740 instead of step 560 to step 600 in the flowchart in FIG. 7.

During-Deceleration Engine-Stall Avoidance Control

In this routine, in step 700 following step 550, the ECU 50 sequentially takes 30°-time differences $\Delta t1$, $\Delta t2$, $\Delta t3$, ... $\Delta tn$ during 720° CA (while the crankshaft 1a rotates twice). Herein, the 30°-time differences $\Delta t1$ to $\Delta tn$ are detection values detected by the rotation number sensor 52 and each represent a difference between two continuous values of the 30°-time t30.

In step 710, the ECU 50 then adds up a series of 30°-time differences $\Delta t1$ to $\Delta tn$ taken this time to calculate a 30°-time locus length A$\alpha$t30. In other words, the ECU 50 obtains the 30°-time locus length A$\Delta$t30 by the sum total of the changes in 30°-time t30 during 720° CA.

Figure 15:
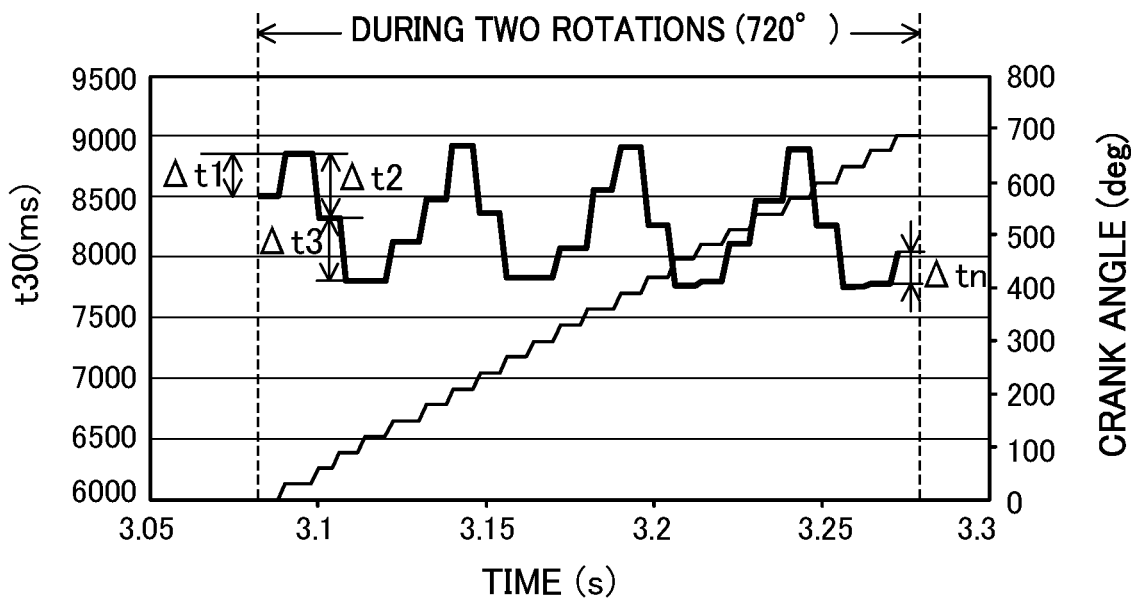
FIG. 15 is a graph showing changes in 30°-time and crank angle in a normal state in the second embodiment.
Figure 16:
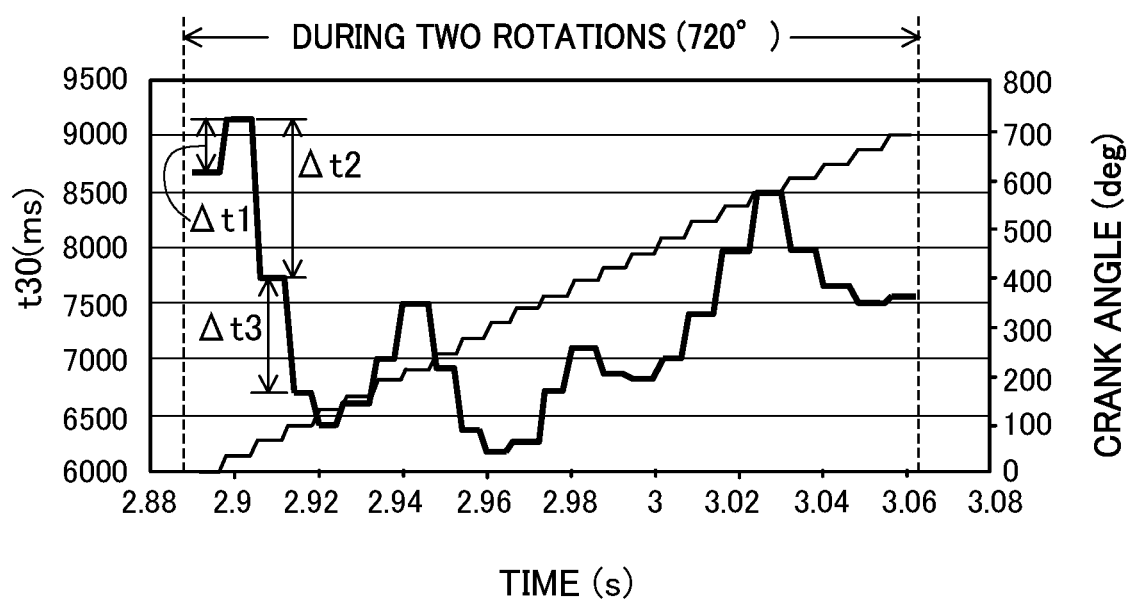
FIG. 16 is a graph showing changes in 30°-time and crank angle in an abnormal state in the second embodiment.

Herein, the 30°-time locus length A$\Delta$t30 indicates the degree of rotation fluctuation of the crankshaft 1a. When each 30°-time difference $\Delta t1$ to $\Delta tn$ is relatively small and a variation between two continuous values is relatively small as shown in FIG. 15, it means that the rotation fluctuation of the crankshaft 1a is small. When each 30°-time difference $\Delta t1$ to $\Delta tn$ is relatively large and a variation between two continuous values is relatively large as shown in FIG. 16, it means that the rotation fluctuation of the crankshaft 1a is large. If this 30°-time locus length A$\Delta$t30 is a relatively large value, it indicates that a combustion state in the engine 1 is unstable (misfire and engine stall are apt to occur). If the 30°-time locus length A$\Delta$t30 is a relatively small value, it indicates that the combustion state is stable (misfire and engine stall are unlikely to occur). FIG. 15 is a graph plotting changes in 30°-time t30 (a thick line) and crank angle (a solid line) in a normal state. FIG. 16 is a graph plotting changes in 30°-time t30 (a thick line) and crank angle (a solid line) in an abnormal state.

In step 720, the ECU 50 determines whether or not the 30°-time locus length A$\Delta$t30 is smaller than a predetermined maximum locus length TAL. If this determination result is negative, the ECU 50 shifts the processing to step 730. If this determination result is affirmative, the ECU 50 advances the processing to step 740.

In step 730, the ECU 50 sets the current 30°-time locus length AΔt30 as the maximum locus length TAL.

In step 740 following step 720 or step 730, the ECU 50 determines whether or not the maximum locus length TAL is smaller than a predetermined value B2. Herein, the predetermined value B2 is a threshold value for determining combustion deterioration (misfire). If the maximum locus length TAL is less than the predetermined value B2, it can be determined that combustion deterioration (misfire) has not occurred (Normal). If the maximum locus length TAL is equal to or larger than the predetermined value B2, it can be determined that combustion deterioration (misfire) has occurred (Abnormal). If this determination result is affirmative, the ECU 50 shifts the processing to step 610. If this determination result is negative, the ECU 50 shifts the processing to step 630.

According to the foregoing during-deceleration engine-stall avoidance control, the following configuration differs from the first embodiment. Specifically, during deceleration of the engine 1, when fuel is supplied to the engine 1 by the injector 25, the ECU 50 is configured to diagnose whether or not combustion deterioration exists in the engine 1 based on changes (30°-time locus length AΔt30) in the detected crank angular velocity (30°-time t30).

Consequently, the configuration in this embodiment can also provide the same operations and effects as those in the first embodiment.

Third Embodiment

A third embodiment embodying the engine system as a gasoline engine system will be described in detail with reference to the accompanying drawings.

Figure 17:
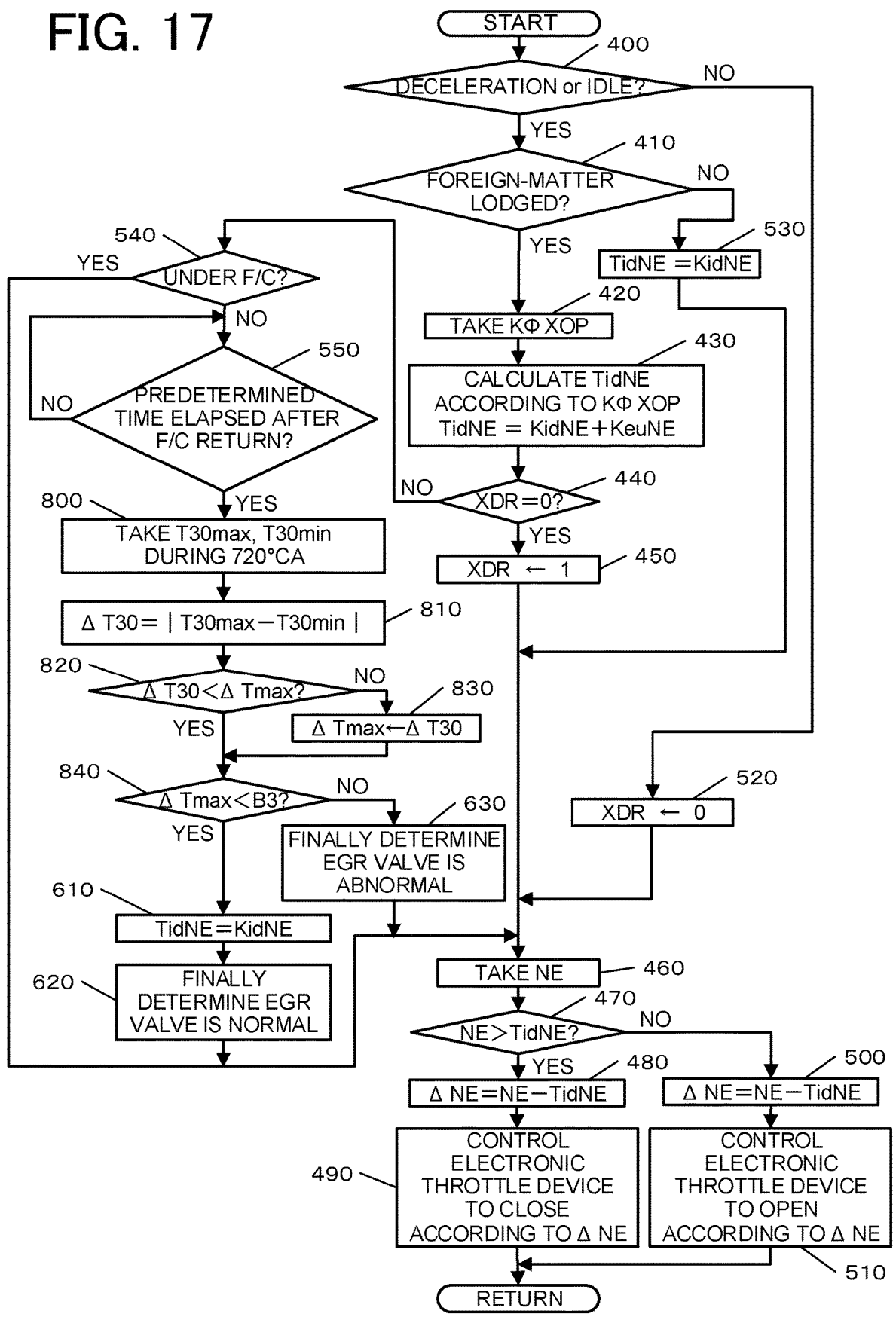
FIG. 17 is a flowchart showing details of during-deceleration engine stall avoidance control in a third embodiment.

The present embodiment differs in configuration from each of the foregoing embodiments in relation to the contents of the during-deceleration engine-stall avoidance control. FIG. 17 is a flowchart showing the control contents. The flowchart in FIG. 17, differing from FIG. 7, includes the processings in step 800 to step 840 instead of step 560 to step 600.

During-Deceleration Engine-Stall Avoidance Control

In this routine, in step 800 following step 550, the ECU 50 takes both a 30°-time maximum peak value T30max and a 30°-time minimum peak value T30min during 720° CA (while the crankshaft rotates twice). Herein, each of the peak values T30max and T30min is a detection value detected by the rotation number sensor 52 and the peak values T30max and T30min respectively indicate a maximum value and a minimum value of peak values T30 of a 30°-time t30 during 720° CA.

In step 810, the ECU 50 then calculates, as a 30°-time undulation amplitude ΔT30, an absolute value of a difference between the 30°-time maximum peak value T30max and the 30°-time minimum peak value T30min that are currently taken. Specifically, the ECU 50 obtains a maximum amplitude of change between the peak values of the 30°-time t30 during 720° CA as the 30°-time undulation amplitude ΔT30.

Figure 18:
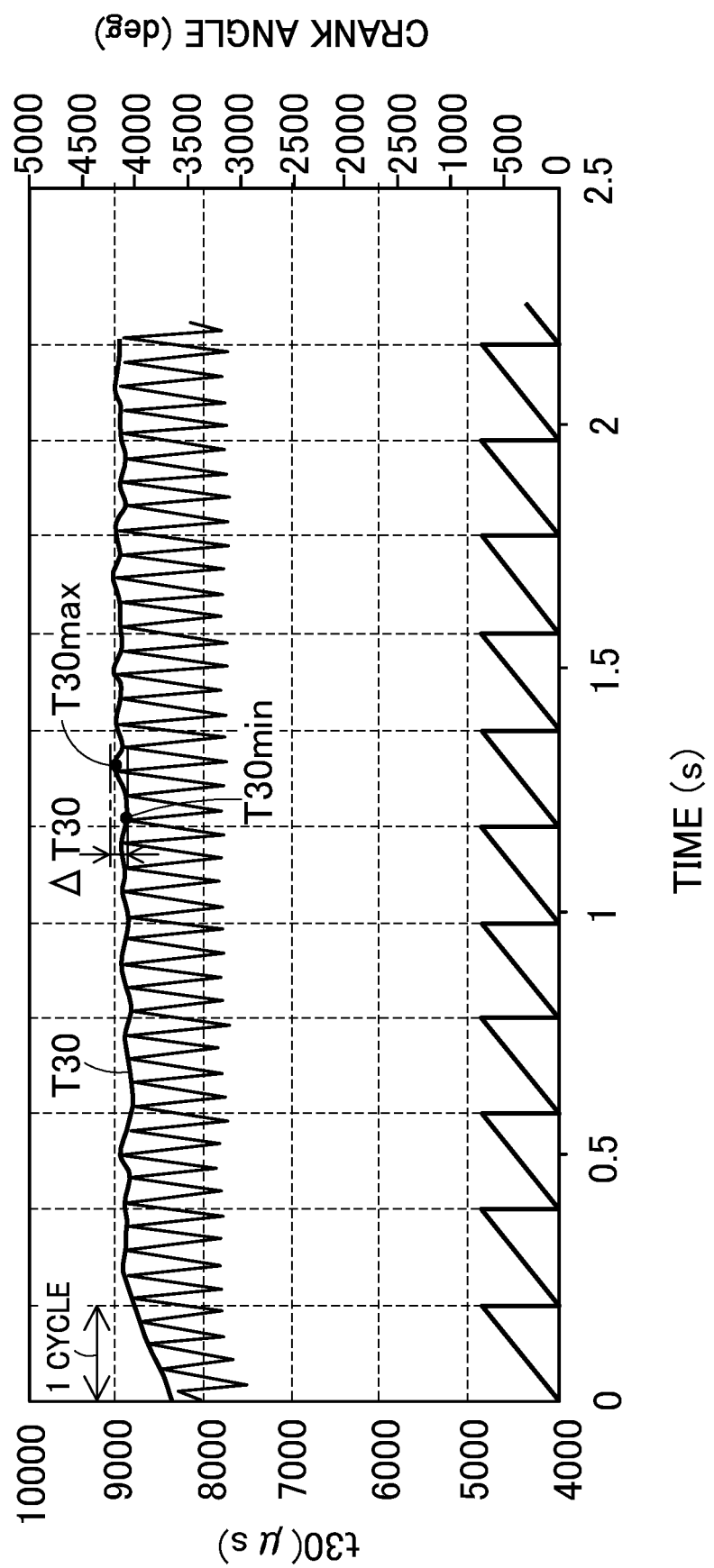
FIG. 18 is a graph showing changes in 30°-time and crank angle in a normal state in the third embodiment.
Figure 19:
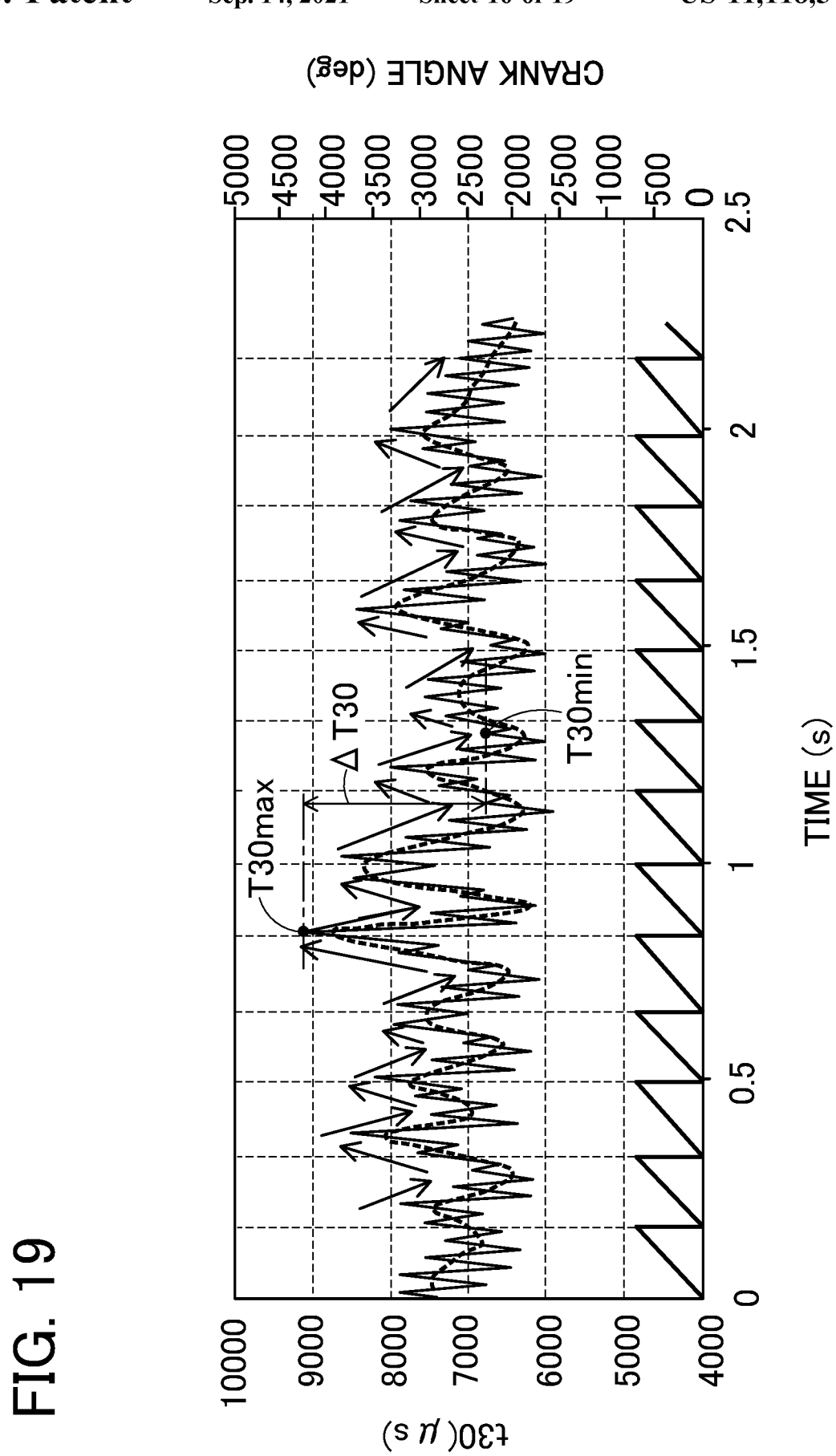
FIG. 19 is a graph showing changes in 30°-time and crank angle in an abnormal state in the third embodiment.

Herein, the 30°-time undulation amplitude ΔT30 indicates the degree of rotation fluctuations of the crankshaft 1a. When this amplitude is a relatively small value as shown in FIG. 18, it means that the rotation fluctuation of the crankshaft 1a is small. When this amplitude is a relatively large value as shown in FIG. 19, it means that the rotation fluctuation of the crankshaft 1a is large. If this 30°-time undulation amplitude ΔT30 is a relatively large value, it indicates that a combustion state in the engine 1 is unstable (misfire and engine stall are apt to occur). If the 30°-time undulation amplitude ΔT30 is a relatively small value, it indicates that the combustion state is stable (misfire and engine stall are unlikely to occur). FIG. 18 is a graph plotting changes in 30°-time t30 (a thick line) and crank angle (a solid line) in a normal state. FIG. 19 is a graph plotting changes in 30°-time t30 (a thick line) and crank angle (a solid line) in an abnormal state.

In step 820, the ECU 50 then determines whether or not the 30°-time undulation amplitude ΔT30 is smaller than a predetermined maximum undulation amplitude ΔTmax. If this determination result is negative, the ECU 50 shifts the processing to step 830. If this determination result is affirmative, the ECU 50 advances the processing to step 840.

In step 830, the ECU 50 sets the current 30°-time undulation amplitude ΔT30 as the maximum undulation amplitude ΔTmax.

In step 840 following step 820 or step 830, the ECU 50 determines whether or not the maximum undulation amplitude ΔTmax is smaller than a predetermined value B3. Herein, the predetermined value B3 is a threshold value for determining combustion deterioration (misfire). When the maximum undulation amplitude ΔTmax is less than the predetermined value B3, it can be determined that undulation amplitude (misfire) has not occurred (Normal). When the maximum undulation amplitude ΔTmax is equal to or larger than the predetermined value B3, combustion deterioration (misfire) has occurred (Abnormal). If this determination result is affirmative, the ECU 50 advances the processing to step 610. If this determination result is negative, the ECU 50 shifts the processing to step 630.

According to the foregoing during-deceleration engine-stall avoidance control, the following configuration differs from the first embodiment. Specifically, during deceleration of the engine 1 and further when fuel is supplied to the engine 1 by the injector 25, the ECU 50 is configured to diagnose whether or not misfire exists in the engine 1 based on changes in the detected crank angular velocity (30°-time t30) (30°-time undulation amplitudes ΔT30).

Consequently, the configuration in this embodiment can also provide the same operations and effects as those in the first embodiment.

Fourth Embodiment

A fourth embodiment embodying the engine system as a gasoline engine system will be described in detail with reference to the accompanying drawings.

Figure 20:
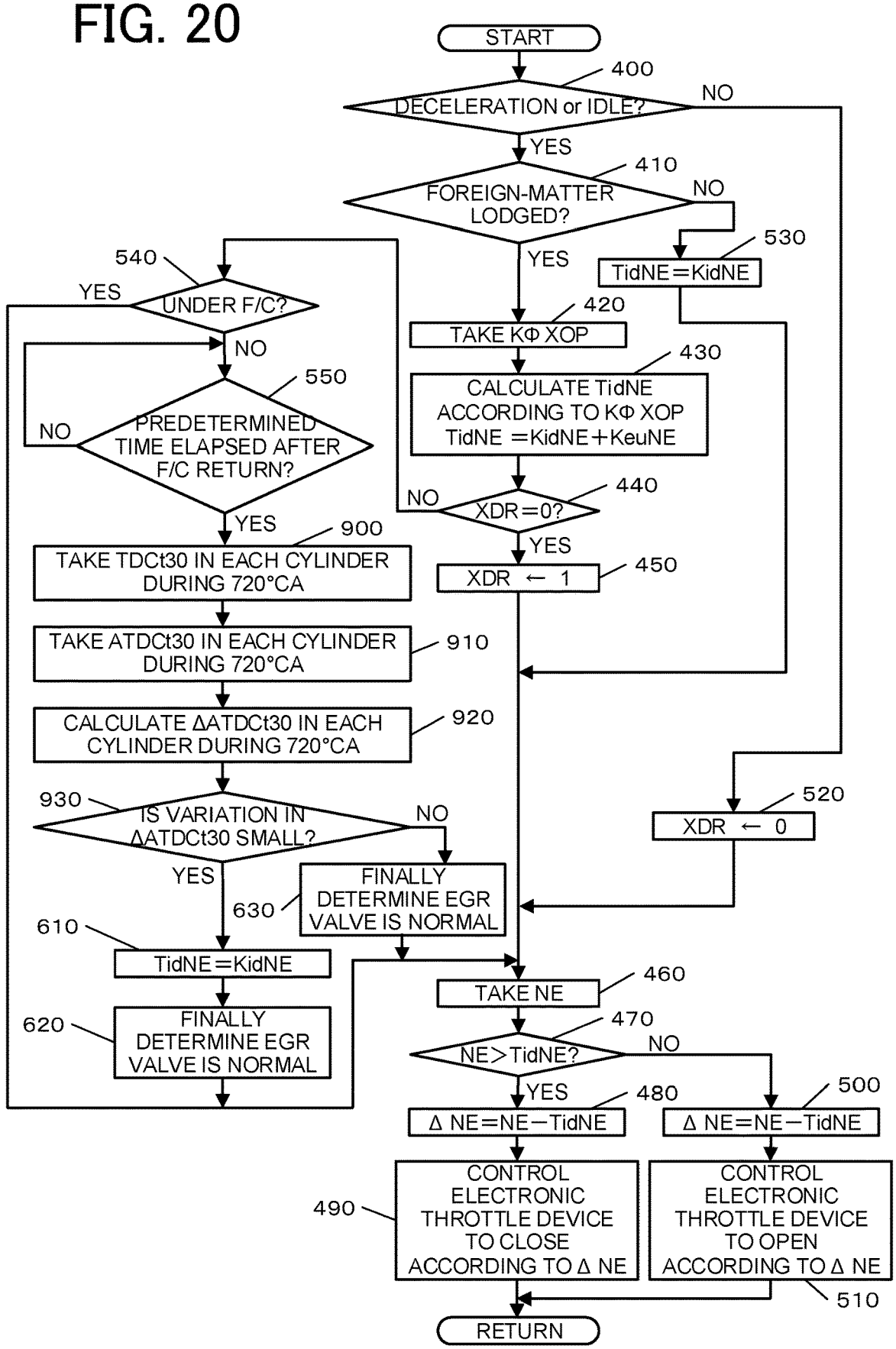
FIG. 20 is a flow chart showing details of during-deceleration engine stall avoidance control in a fourth embodiment.
Figure 21:
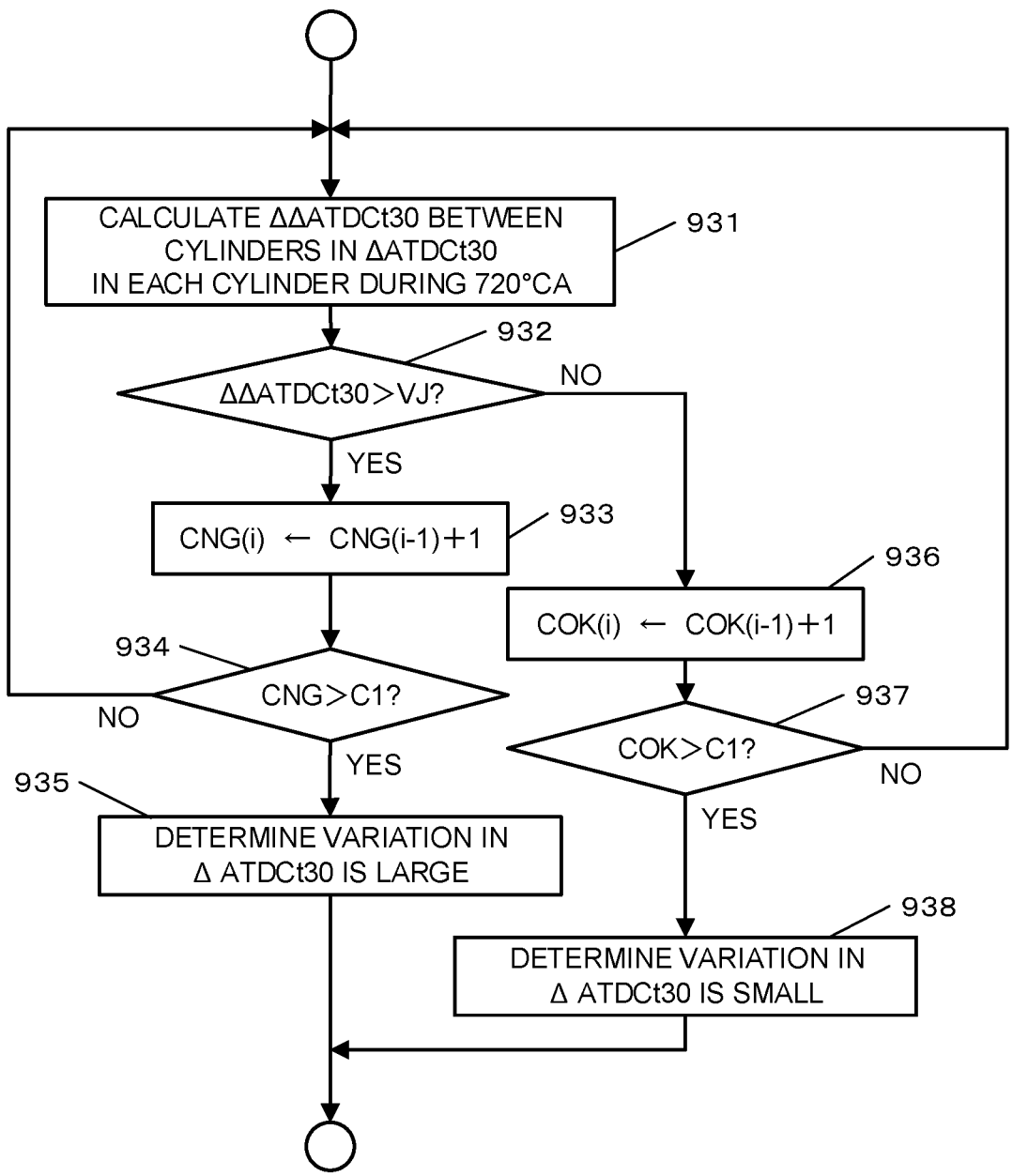
FIG. 21 is a flowchart showing details of a step 930 in FIG. 21 in the fourth embodiment.

The present embodiment differs in configuration from each of the foregoing embodiments in relation to the contents of the during-deceleration engine-stall avoidance control. FIG. 20 is a flowchart showing the control contents. The flowchart in FIG. 20, differing from FIG. 7, includes the processings in step 900 to step 930 instead of step 560 to step 600. FIG. 21 is a flowchart showing the details of step 930 in FIG. 20.

During-Deceleration Engine-Stall Avoidance Control

In this routine, in step 900 following step 550, the ECU 50 takes a top dead center 30°-time TDCt30 of each cylinder (four cylinders: #1 to #4) during 720° CA (while the crankshaft 1a rotates twice). Herein, the top dead enter 30°-time TDCt30 is a detection value detected by the rotation number sensor 52 and indicates a 30°-time t30 required for the piston in each cylinder to reach the top dead center during 720° CA.

In step 910, the ECU 50 takes an after top dead center 30°-time ATDCt30 of each cylinder during 720° CA. Herein, the after top dead center 30°-time ATDCt30 is a detection value detected by the rotation number sensor 52 and indicates a 30°-time t30 required for the piston in each cylinder having reached the top dead center to further rotate 30° CA therefrom during 720° CA.

In step 920, the ECU 50 calculates a difference between the top dead center 30°-time TDCt30 and the after top dead center 30°-time ATDCt30 in each cylinder, which are currently taken, to obtain an after top dead center 30°-time difference ΔATDCt30 in each cylinder.

Figure 22:
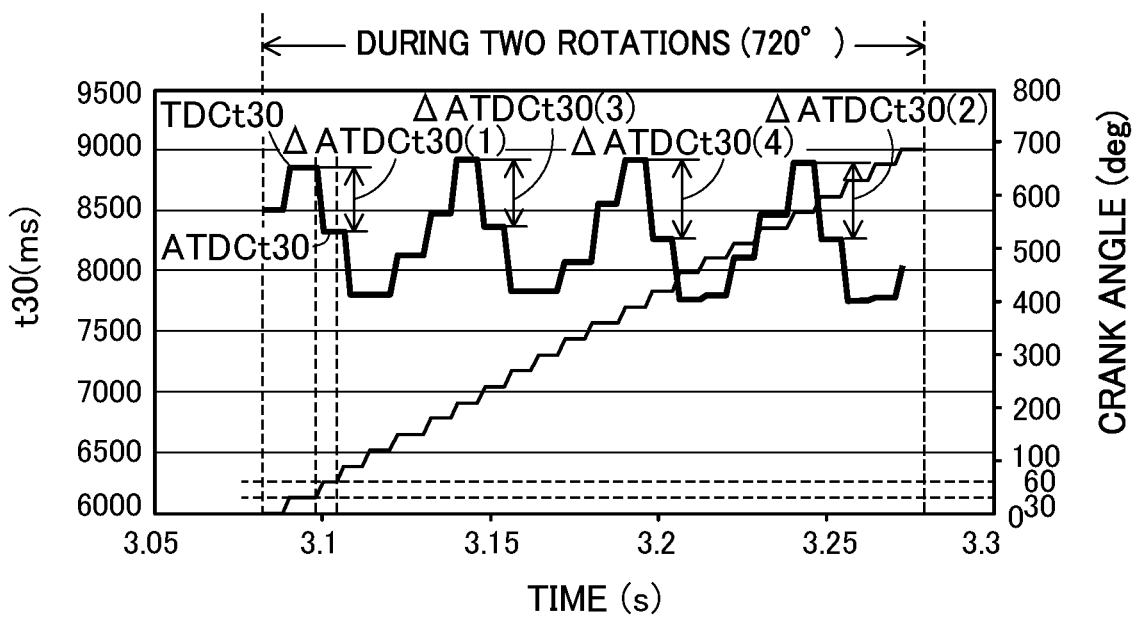
FIG. 22 is a graph showing changes in 30°-time and crank angle in a normal state in the fourth embodiment.
Figure 23:
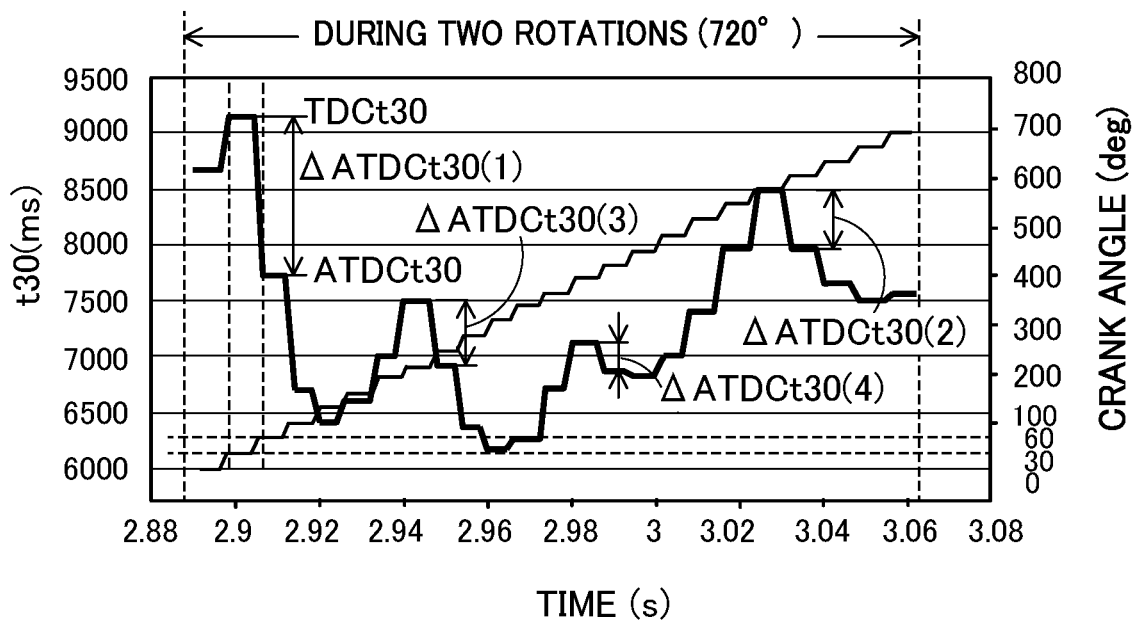
FIG. 23 is a graph showing changes in 30°-time and crank angle in an abnormal state in the fourth embodiment.

Herein, the after top dead center 30°-time difference ΔATDCt30 represents the degree of rotation fluctuation of the crankshaft 1a during two rotations of this shaft 1a. When this difference is a relatively small value and the variation of values (ΔATDCt30(1) to ΔATDCt30(4)) between the cylinders is relatively small as shown in FIG. 22, it means that the rotation fluctuation of the crankshaft 1a is small. When relatively large values are included and the variation of values between the cylinders is relatively large as shown in FIG. 23, it means that the rotation fluctuation of the crankshaft 1a is large. If the variations in the after top dead center 30°-time differences ΔATDCt30 are relatively large among the cylinders as above, it means that a combustion state in the engine 1 is unstable (misfire and engine stall are likely to occur). If those variations are relatively small among the cylinders, it means that the combustion state is stable (misfire and engine stall are unlikely to occur). FIG. 22 is a graph plotting changes in 30°-time t30 (a thick line) and crank angle (a solid line) in a normal state. FIG. 23 is a graph plotting changes in 30°-time t30 (a thick line) and crank angle (a solid line) in an abnormal state. In FIGS. 22 and 23, the parenthesized numerals in ΔATDCt30(1) to ΔATDCt30(4) denote the cylinder numbers in the engine 1.

In step 930, the ECU 50 determines whether or not the variation in the after top dead center 30°-time difference ΔATDCt30 is small. The details of this determination will be described later. Herein, if the variation is small, it can be determined that combustion deterioration (misfire) has not occurred (Normal). If the variation is not small, it can be determined that combustion deterioration (misfire) has occurred (Abnormal). If this determination result is affirmative, the ECU 50 advances the processing to step 610. If this determination result is negative, the ECU 50 shifts the processing to step 630.

Herein, the processing details of step 930 will be described below with reference to the flowchart in FIG. 21. When the processing goes to step 930, the ECU 50 first, in step 931, calculates a difference between two continuous values of the after top dead center 30°-time difference ΔATDCt30 between the cylinders during 720° CA to obtain the 30°-time difference variation ΔΔATDCt30.

In step 932, the ECU 50 determines whether or not the 30°-time difference variation ΔΔATDCt30 is larger than a predetermined variation determination value VJ. Herein, the variation determination value VJ is a threshold value for determining the occurrence of engine stall. If the 30°-time difference variation ΔΔATDCt30 is larger than the variation determination value VJ, there is a tendency for the 30°-time to widely vary. If the 30°-time difference variation ΔΔATDCt30 is equal to or less than the variation determination value VJ, there is no tendency for the 30°-time to widely vary. If this determination result is affirmative, the ECU 50 advances the processing to step 933. If this determination result is negative, the ECU 50 shifts the processing to step 936.

In step 933, the ECU 50 adds 1 to a previous abnormality determination number CNG(i−1) to obtain an abnormality determination number CNG(i), that is, increments the abnormality determination number CNG by one.

In step 934, the ECU 50 determines whether or not the determination number CNG is larger than a predetermined determination value C1. If this determination result is affirmative, the ECU 50 advances the processing to step 935. If this determination result is negative, the ECU 50 returns the processing to step 931.

In step 935, the ECU 50 determines that the variation in the after top dead center 30°-time difference ΔATDCt30 is large.

In step 936 following step 932, the ECU 50 adds 1 to a previous normal determination number COK(i−1) to obtain a normality determination number COK(i), that is, increments the normal determination value COK by one.

In step 937, the ECU 50 determines whether or not the normality determination number COK is larger than a predetermined determination value C1. If this determination result is affirmative, the ECU 50 advances the processing to step 938. If this determination result is negative, the ECU 50 returns the processing to step 931.

In step 938, the ECU 50 determines that the variation in the after top dead center 30°-time difference ΔATDCt30 is small.

According to the foregoing during-deceleration engine-stall avoidance control, the following configuration differs from the first embodiment. Specifically, during deceleration of the engine 1 and further when fuel is supplied by the injector 25 to the engine 1, the ECU 50 is configured to diagnose whether or not combustion deterioration exists in the engine 1 based on the detected crank angular velocity (the 30°-time t30).

Consequently, the configuration in the present embodiment can also provide the same operations and effects as those in the first embodiment.

The foregoing embodiments are mere examples and give no limitation to the present disclosure. The present disclosure may be embodied in other specific forms without departing from the essential characteristics thereof.

(1) Each of the foregoing embodiments applies the electronic throttle device 14 to the output adjusting unit and describes the idle-up control using this electronic throttle device 14 as the engine stall avoidance control. An alternative is to apply the ignition device 29 to the output adjusting unit and an ignition timing advance control using the ignition device 29 to the engine stall avoidance control. Another alternative is to apply the injector 25 to the output adjusting unit and a fuel amount increasing control using the injector 25 to the engine stall avoidance control.

(2) Each of the foregoing embodiments is configured to detect a combustion state of the engine 1 by the rotation number sensor 52 (the crank angular velocity detecting unit). An alternative may be configured to detect a combustion state of the engine by a cylinder pressure sensor for detecting the pressure in each cylinder of the engine.

(3) In each of the foregoing embodiments, the EGR device 10 is embodied as a so-called high-pressure loop EGR device in a gasoline engine system equipped with no supercharger. Alternatively, it may be embodied as a so-called high-pressure loop and low-pressure loop EGR device in a gasoline engine system equipped with a supercharger.

(4) In each of the foregoing embodiments, the present disclosure is applied to a gasoline engine system, but may be applied to a diesel engine system.

INDUSTRIAL APPLICABILITY

The present disclosure is applicable to a gasoline engine system or a diesel engine system, each including an EGR device.

REFERENCE SIGNS LIST

1 Engine
1a Crank shaft
3 Intake passage
5 Exhaust passage
10 EGR device (Exhaust gas recirculation device)
14 Electronic throttle device (Intake amount adjusting valve, Output adjusting unit)
17 EGR passage (Exhaust gas recirculation passage)
18 EGR valve (Exhaust gas recirculation valve)
23 Throttle sensor (Operating-state detecting unit)
25 Injector (Fuel supply unit, Output adjusting unit)
27 Accelerator sensor (Operating-state detecting unit)
29 Ignition device (Output adjusting unit)
32 Valve seat
33 Valve element
50 ECU (Control unit)
51 Intake pressure sensor (Operating-state detecting unit)
52 Rotation number sensor (Operating-state detecting unit, Rotation number detecting unit, Crank angular velocity detecting unit)
53 Water temperature sensor (Operating-state detecting unit)
54 Air flow meter (Operating-state detecting unit)
55 Air-fuel ratio sensor (Operating-state detecting unit)

The invention claimed is:

1. An engine system comprising:
an engine;
an intake passage configured to introduce intake air into the engine;
an exhaust passage configured to discharge exhaust gas from the engine;
a fuel supply unit configured to supply fuel to the engine;
an exhaust gas recirculation device including:
an exhaust gas recirculation passage configured to allow part of the exhaust gas discharged from the engine to the exhaust passage to flow as an exhaust recirculation gas into the intake passage to recirculate into the engine; and
an exhaust gas recirculation valve configured to regulate a flow rate of the exhaust recirculation gas in the exhaust gas recirculation passage,
the exhaust gas recirculation valve including a valve seat and a valve element provided to be capable of seating on the valve seat;
an output adjusting unit configured to adjust output of the engine;
an operating-state detecting unit configured to detect an operating state of the engine; and
a controller configured to control at least the fuel supply unit, the exhaust gas recirculation valve, and the output adjusting unit based on the detected operating state of the engine,
wherein, during deceleration of the engine, the controller is configured to diagnose whether or not abnormality exists in the exhaust gas recirculation valve in opening/closing between the valve seat and the valve element based on the detected operating state of the engine, and
when fuel is supplied to the engine by the fuel supply unit during deceleration of the engine, the controller is also configured to diagnose whether or not combustion deterioration exists in the engine based on the detected operating state,
when it is provisionally determined that the abnormality exists, the controller is configured to control the output adjusting unit to perform a predetermined engine stall avoidance control, and
when it is subsequently determined that the combustion deterioration exists, the controller is configured to finally determine that the abnormality exists and continue the engine stall avoidance control, or
when it is subsequently determined that the combustion deterioration does not exist, the controller is configured to finally determine that the abnormality does not exist and cancel the engine stall avoidance control.

2. The engine system according to claim 1, wherein
the operating-state detecting unit includes a crank angular velocity detecting unit configured to detect a crank angular velocity of the engine, and
the controller is configured to diagnose whether or not the combustion deterioration exists in the engine based on a change in the detected crank angular velocity.

3. The engine system according to claim 1, wherein
the output adjusting unit includes an intake amount adjusting valve configured to adjust an amount of intake air allowed to flow through the intake passage,
the operating-state detecting unit includes a rotation number detecting unit configured to detect the number of rotations of the engine, and
the controller is configured to perform feedback control of the intake amount adjusting valve such that the detected number of rotations becomes a predetermined target idle rotation number, and configured to execute idle-up control, as the engine stall avoidance control, in which the target idle rotation number is set to a predetermined set value to avoid engine stall until a predetermined time elapses from start of the deceleration.

4. The engine system according to claim 2, wherein
the output adjusting unit includes an intake amount adjusting valve configured to adjust an amount of intake air allowed to flow through the intake passage,
the operating-state detecting unit includes a rotation number detecting unit configured to detect the number of rotations of the engine, and
the controller is configured to perform feedback control of the intake amount adjusting valve such that the detected number of rotations becomes a predetermined target idle rotation number, and configured to execute idle-up control, as the engine stall avoidance control, in which the target idle rotation number is set to a predetermined set value to avoid engine stall until a predetermined time elapses from start of the deceleration.

* * * * *